United States Patent [19]

Takeuchi et al.

[11] Patent Number: 5,758,053
[45] Date of Patent: May 26, 1998

[54] FAULT HANDLING AND RECOVERY FOR SYSTEM HAVING PLURAL PROCESSORS

[75] Inventors: Shigeo Takeuchi, Hannou; Yasuhiro Inagaki, Kodaira; Junji Nakagoshi, Hadano; Shinichi Shutoh, Yokohama; Tatsuo Higuchi, Fuchu; Hiroaki Fujii, Kokubunji; Yoshiko Yasuda, Kokubunji; Kiyohiro Obara, Kokubunji; Taturu Toba; Masahiro Yamada, both of Hatano, all of Japan

[73] Assignees: Hitachi, Ltd.; Hitachi ULSI Engineering Corp., both of Tokyo, Japan

[21] Appl. No.: 189,683

[22] Filed: Feb. 1, 1994

Related U.S. Application Data

[63] Continuation-in-part of Ser. No. 916,630, Jul. 22, 1992.

[30] Foreign Application Priority Data

Feb. 1, 1993 [JP] Japan ................................ 5-014639

[51] Int. Cl.⁶ .......................... H04J 6/00; H04L 12/00
[52] U.S. Cl. .................... 395/182.02; 395/183.19; 395/408; 395/182.16; 370/402
[58] Field of Search ............................ 395/575, 800, 395/200, 182.05, 408, 183.07, 183.19, 185.09, 185.1, 182.02, 182.16; 371/11.1; 370/402

[56] References Cited

U.S. PATENT DOCUMENTS

| | | |
|---|---|---|
| 4,166,929 | 9/1979 | Sheibam . |
| 4,195,351 | 3/1980 | Barner .................................. 364/900 |

(List continued on next page.)

FOREIGN PATENT DOCUMENTS

| | | |
|---|---|---|
| 2545976B1B | 11/1976 | Germany . |
| 4-139566 | of 0000 | Japan . |
| A-1-251266 | of 0000 | Japan . |
| A-1-267763 | of 0000 | Japan . |
| A-2-91755 | of 0000 | Japan . |
| A-61-35645 | of 0000 | Japan . |
| 63-124162 | 5/1988 | Japan . |
| 3-209550 | 9/1991 | Japan . |
| 5-28122 | 2/1993 | Japan . |

OTHER PUBLICATIONS

Computer Systems Design, (Sanpo KK), pp. 216-218.
Routing Controller of Cellular Array Processor CAP-II, by T. Horie et al, The Information Processing Society of Japan Research Report, vol. 90, No. 60, pp. 223-228.
Broadcast-Network of Highly Parallel Processor CAP-II, by S. Kato et al, The Information Processing Society of Japan Research Report, vol. 90, No. 60, pp. 229-234.

*Primary Examiner*—Jack B. Harvey
*Assistant Examiner*—Paul R. Myers
*Attorney, Agent, or Firm*—Fay, Sharpe, Beall, Fagan, Minnich & McKee

[57] ABSTRACT

Parallel processors communicate with each other over a network by transmitting messages that include destination processor information. A message controller for each processor in the network receives the messages and checks for faults in the message, particularly in the destination processor number contained in a first word of the message. If a fault occurs in the destination processor number, then the faulty message is transmitted to an appropriate processor for handling the fault. In this way the network operation is not suspended because of the fault and the message is not left in the network as a result of the error occurring in the destination processor number. The processor to which the faulty message is directed is determined by a substitute destination processor number contained in the message or is predetermined and set in another way, such as by a service processor. To recover from the fault, the processor receiving the faulty message can request that the message be retransmitted or the error can be corrected using an ECC, for example. If the faulty message cannot be retransmitted, then the processor or the host processor can request that the job to which the faulty message pertains be canceled by all of the processors executing that job without affecting the simultaneous execution of other jobs by the same processors.

24 Claims, 13 Drawing Sheets

U.S. PATENT DOCUMENTS

| | | | |
|---|---|---|---|
| 4,281,380 | 7/1981 | DeMuga et al. . | |
| 4,412,281 | 10/1983 | Works | 364/200 |
| 4,417,334 | 11/1983 | Gunderson et al. | 370/16 |
| 4,527,237 | 7/1985 | Frieder | 364/200 |
| 4,598,400 | 7/1986 | Hillis | 370/60 |
| 4,598,404 | 7/1986 | Perry et al. | 371/49 |
| 4,663,706 | 5/1987 | Allen et al. . | |
| 4,667,287 | 5/1987 | Allen et al. . | |
| 4,677,191 | 6/1987 | Carter et al. . | |
| 4,679,189 | 7/1987 | Olson | 370/60 |
| 5,036,518 | 7/1991 | Tsung . | |
| 5,065,308 | 11/1991 | Evans | 395/800 |
| 5,115,499 | 5/1992 | Stilz et al. . | |
| 5,126,999 | 6/1992 | Munter et al. . | |
| 5,129,077 | 7/1992 | Hillis | 395/500 |
| 5,166,674 | 11/1992 | Baum et al. . | |
| 5,181,017 | 1/1993 | Frey | 340/825.02 |
| 5,182,750 | 1/1993 | Bales et al. | 370/110.1 |
| 5,239,654 | 8/1993 | Ino-Simmons | 395/800 |
| 5,251,299 | 10/1993 | Masuda | 395/200 |
| 5,271,014 | 12/1993 | Bruck | 371/11.1 |
| 5,280,474 | 1/1994 | Nickolls | 370/60 |
| 5,301,273 | 4/1994 | Konishi | 395/200 |
| 5,301,322 | 4/1994 | Hamanaka | 395/650 |
| 5,305,462 | 4/1994 | Grondalski | 395/800 |
| 5,313,408 | 5/1994 | Goto | 364/514 |
| 5,321,813 | 6/1994 | McMillen | 395/200 |
| 5,369,695 | 11/1994 | Chakravarti et al. | 379/211 |
| 5,428,799 | 6/1995 | Woods et al. | 395/739 |

FIG. 5

| MODE REGISTER VALUE | SELECTED REGISTER | VALUE HELD |
|---|---|---|
| 0 | REGISTER A 103 | PREDETERMINED DESTINATION PROCESSOR NUMBER SET BY SER PROC |
| 1 | REGISTER C 106 | SOURCE PROCESSOR NUMBER A20 INCLUDED IN A MESSAGE |
| 2 | REGISTER D 107 | DESTINATION PROCESSOR NUMBER B20 INCLUDED IN A MESSAGE FOR USE AT OCCURENCE OF FAULT |

FAULT HANDLING AND RECOVERY FOR SYSTEM HAVING PLURAL PROCESSORS

This application is a continuation-in-part application U.S. Ser. No. 07/916.630 filed on Jul. 22, 1992.

FIELD OF THE INVENTION

The invention relates to a system of plural processors having a message transmission fault handling and recovery capability. In particular, when data is transmitted between processors in the system and a fault occurs in the transmission, the system handles the processing of the fault by routing the faulty message to an appropriate processor.

BACKGROUND OF THE INVENTION

As discussed by Kozo Kayashimi in *Computer Systems Design*, (Sanpo KK), pgs. 216–218, data transmission errors caused by hardware faults can be detected by adding a parity bit or an error correction code (ECC) to the transmitted data. In a system that detects such data transmission errors, a parity check is performed for every byte of transmitted data and the result of the check is recorded with a flip-flop.

When an error occurs, the error state is accurately preserved and prevented from affecting the logic sections operating normally. This is achieved by terminating or freezing the timing pulse of the overall system so that the execution state of the system is locked at the time the error is detected. The locked state is then logged out to a memory device to provide a record of the error state. The information logged out to the memory device is analyzed and a judgment is made as to whether or not the execution can be resumed.

SUMMARY OF THE INVENTION

In the aforementioned system, the system execution is suspended in response to the detection of a fault occurring in the transmission of a message. When this response to the detection of a fault is applied to a multiple processor system operating in a mode in which a plurality of user jobs are executed simultaneously, operation of the entire system is suspended. As a result, messages being transmitted that are unrelated to the message in which the fault occurred are affected by being temporarily stopped. This prevents efficient operation of the system, and in some cases may even cause unintended termination of one of the multiple jobs being executed.

An example of a system having a plurality of parallel processors interconnected by a network topology is disclosed in Japanese Laid-Open Application No. 63-124162. In such a system, two messages having different source and different destination processors or locations may pass through a shared part of the topology as they are routed to their respective destinations. If a fault occurs during the time these two messages are sharing the same part of the topology, the transmission of one message would be stopped because of the error detection, as intended. However, the other message would also be blocked or halted despite the lack of an error being detected therein. As a result, although the transmission of message having an error is halted, the halted message causes the unintended suspension or termination of execution of other job(s) unrelated to the job in which an error in transmission has occurred.

Another example of a system having parallel processors is disclosed in Japanese Laid-Open Application No. 4-139566. In this parallel processor system, an error correction code (ECC) is added to messages transferred between processors. Specifically, an ECC is added to the destination processor number in the message, and if a fault occurs in this number, then it is corrected so that the message is still sent to the correct destination processor. In this system, however, if a fault occurs that cannot be corrected by adding an ECC to the message, the fault remains as a problem for the system.

According to an object of the invention, such problems occurring with the application of known fault handling responses in systems having plural processors is overcome. In particular, according to the invention, fault recovery is enabled in cases where intermittent faults occur in the transmission of messages over a network interconnecting the processors. Such faults may occur in the cables or wiring used to interconnect the system components, such as the processors, or in the wires of the boards used in the system. The faults may occur as a result of system noise or power fluctuations in the source voltage, and they may affect only one job being executed without similarly affecting other jobs being simultaneously executed.

It is an object of the invention to respond to faults occurring in the transmission of a message between processors in a multiple processor system by transmitting the faulty message to an appropriate processor or the host processor where fault recovery processing is performed. In this way, it is unnecessary to suspend the execution of other system processors not affected by the fault. Further, if a fault is detected in the destination processor number of the message and the desired destination of the message cannot therefore be determined, an alternative processor number is provided to which the faulty message is sent.

For this purpose, the invention establishes in the message being transmitted a field for setting a fault occurrence bit indicating the occurrence of a fault during message transmission between processors. The fault occurrence bit is set by a fault detection circuit that detects for the occurrence of faults occurring in the words of the message that relate to message transmission.

It is a first object of the invention to provide fault recovery in cases where intermittent faults during message transmission occur by providing a message with a substitute destination processor number to which the message is transmitted when a fault occurs in the destination processor number.

It is an object of the invention according to another embodiment to provide fault recovery in cases where intermittent faults occur during message transmission by assigning a predetermined processor within the network to receive messages having a fault that is detected in the destination processor number.

It is an object of the invention according to another embodiment to provide fault recovery in cases where intermittent faults occur during message transmission over a crossbar network similar to the network having multiple pairs of input/output ports for parallel transfer of messages among processors having a two-dimensional or three dimensional address.

According to the invention, since messages having an error are transmitted to an appropriate processor designated by the substitute processor destination number or by the predetermined processor number specified for receiving faulty messages, it does not remain in the network.

Furthermore, it is an object of the invention to transfer fault related information together with the message to an appropriate processor so that the processor receiving the faulty message is able to perform appropriate fault recovery processing.

BRIEF DESCRIPTION OF THE DRAWINGS

FIG. 5 is a table explaining the mode register values for mode register 104.

DETAILED DESCRIPTION OF THE PREFERRED EMBODIMENTS

The invention is applicable to any system that transmits data among a plurality of processors over a system network. Exemplary of such a system is a parallel computer and the embodiments of the invention are explained with reference to a parallel computer.

Embodiment 1

Figure 1:
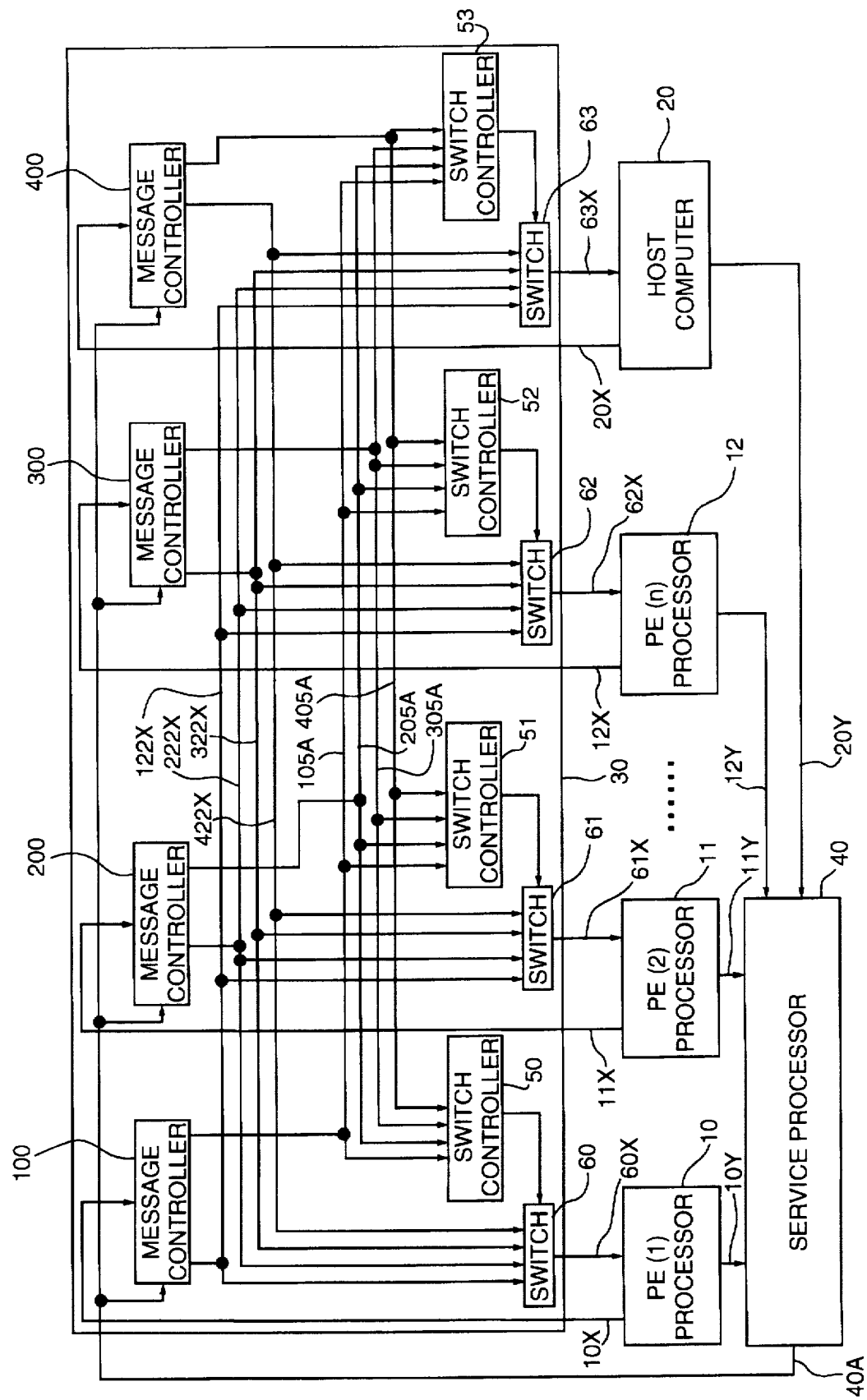
FIG. 1 is a diagram of a system having a plurality of processors interconnected by a network and having a fault recovery capability according to the present invention.

FIG. 1 shows the configuration of a parallel computer having a fault recovery capability according to a first embodiment of the present invention. When a fault is detected in the destination processor number and the destination processor number cannot be accurately determined, the destination processor number is replaced by the number of another processor so that the message is not stopped in the network, but continues to be transmitted to an appropriate processor for processing of the fault.

Each processor element (PE) has a memory for storing programs and a CPU for executing the programs using data transmitted to the processor. The processors operate independently, and are otherwise conventional units of the system so their detail is not included in the drawing.

A host computer 20 assigns jobs to be executed by the processors and specifically preloads the processors with the programs to be executed and the data that is needed for completing the jobs. Also, the data from the processors is read by the host computer after the jobs are completed.

A network 30 transmits the data in a message format between different processors and between the processors and the host computer. Preferably, the network 30 comprises a crossbar network in this embodiment and is an LSI. Accordingly, it is assumed that faults occurring in the transmission of data do not occur in the LSI because of the inherent high reliability of an LSI as compared with system connections that use cable or wire on the board. Rather, it is assumed that the transmission errors occur when message data is transferred over signal lines constituted by cable connection or wires on the system board, such as signal lines 10X, 11X, 12X or 60X, 61X, 62X and 63X.

In this embodiment, plural jobs, such as job 1 and job 2 can be executed at the same time. Each processor in a system may be assigned to a particular job, as follows.

Job 1: PE(1), PE(2), PE(n).
Job 2: PE(1), PE(2).

Given this assignment of jobs to the processors, processors PE(1) and PE(2) will execute two jobs at the same time. Processors assigned to the same job transmit messages required for executing the jobs to each other over the network.

Figure 3:
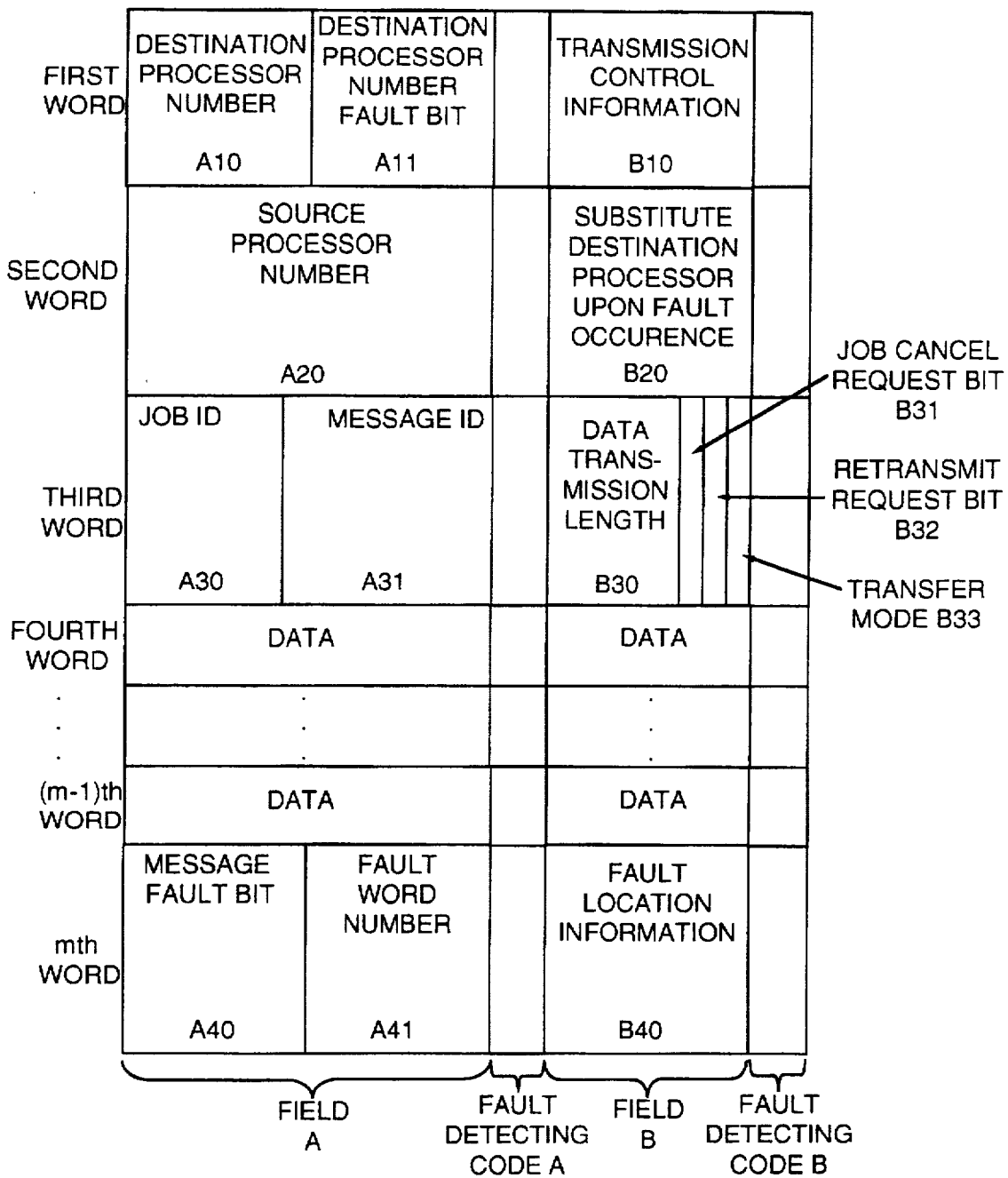
FIG. 3 is a diagram showing a format of a message transmitted over the system network according to a first embodiment of the invention.

A first format for the transmission of messages over the network from a source processor to a destination processor is shown in FIG. 3. To execute job 1, for example, messages are transmitted between PE(1) and PE(2) and PE(n), while messages are transmitted between PE(1) and PE(2) to execute job 2. The following explanation is provided for the transmission of a message from PE(1) to PE(2).

The message source processor PE(1) 10 assembles the message according to the format shown in FIG. 3. The assembly of the message is conducted by either a program or by hardware specifically provided for this purpose. The message is transmitted in units each consisting of one message that includes a plurality of words.

Each word of the message includes a "field A", and "fault detecting code A" for detecting a transmission error in field A, and similarly a "field B" and "fault detecting code B" for detecting a transmission error in field B. While numerous fault detecting codes are available for detecting different kinds of faults or errors, such as an "ECC" or other code, a parity bit is used in this example. A one fault bit can be corrected using an ECC, but a two bit fault can only be detected and cannot be corrected. Therefore, even if ECC is used in this embodiment, the occurrence of a two bit fault that cannot be corrected by an ECC is handled in the following manner.

The message attribute information is provided in the second through third words of the message. The fourth through (m−1)th words are reserved for transmitting data between the processors for executing the job. The mth or last word contains information relating to a message fault. Other parameters affecting the transmission of a message that do not relate to the fault handling capability of the present invention, such as message length limit, etc. are not discussed in further detail herein.

In field A of the first word, a destination processor number A(10) and a fault destination processor number fault bit A(11) indicating that a fault has occurred in this field are set. The systems has "n" number of processors that communicate over a network. Based on the destination processor number A(10), the network 30 controls a series of internal switches 60 to 63 in accordance with control signals received from switch controllers 50–53 as discussed in greater detail hereinafter. When the destination is the host processor, the destination processor number is set with the value of "n+1". Before message transmission, the message source processor turns off the destination processor number fault bit A(11) by setting it to zero. If a fault occurs in field A of the first word during message transmission, the fault bit is set to "1". In field B of the first word, priority information and other message transmission control information not directly related to the destination is provided.

In field A of the second word, the source processor number A(20) is set. A substitute destination processor number B(20) is set in field B of the second word. The substitute destination processor number is used when a fault occurs in message transmission. More specifically, the substitute processor number identifies the predetermined substitute processor to which the message is to be transmitted when the destination processor cannot be determined because a fault has occurred during the message transmission.

The third word of the message has a job ID A(30) and a message ID A(31) set in field A. The job ID identifies the job, whereas the message ID identifies the message. In field B of the third word, the data transmission length B30, the job cancel request bit B31, the retransmit request bit B32 and the transfer mode B33 are set. The transfer mode indicates whether the message can be retransmitted. A retransmittable message is one that is in the memory of a source processor until the source processor receives a reply message indicating whether a fault occurred in the transmission of the message to the destination processor. Therefore, when the source processor receives a reply message indicating that the fault occurred for any reason, the source processor can send the same message again. This is accomplished by setting the retransmit request bit B32 to "1", which is interpreted as meaning that there is a request to retransmit the message from the source processor to the destination processor. When the job cancel request bit B31 is set to "1", it means that there is a request to cancel the job indicated by job ID A30, to which the message pertains. It may be necessary to cancel a job if the message containing the fault is essential to further execution of the job.

Field A of the mth word is for setting a message fault bit indicating the occurrence of a fault in a word in the message and for setting a fault word number indicating which word the fault has occurred in. The source processor resets the message fault bit to zero before transmission. Field B of the mth word is for setting the fault location information that indicates where in the transmission path between the source and the destination processors the fault has occurred.

Figure 2:
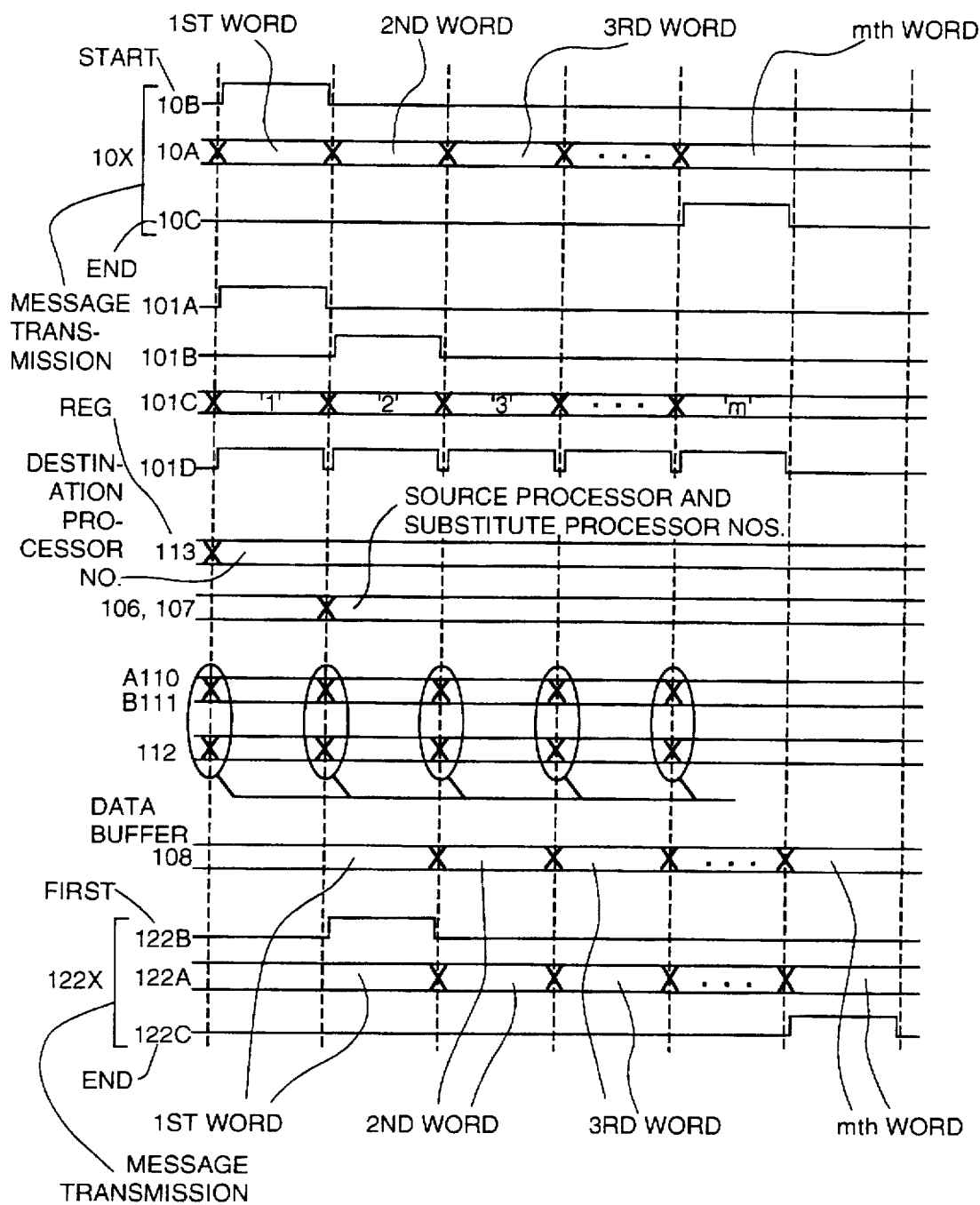
FIG. 2 is a timing diagram useful for explaining the response to the detection of a fault in the fault recovery system of the present invention.

The message assembled in the source processor PE(1) 10 in FIG. 1 is transmitted to the network 40 via a signal line 10X. The signal line 10X consists of three types of signal lines 10A, 10B and 10C, for the three types of signals shown in FIG. 2. As shown in the figure, signal line 10B carries a signal indicating the start of message transmission; signal line 10A carries the signal for message transmission, and signal line 10C carries a signal indicating the end of message transmission. The message start signal takes a value of "1" simultaneously with the transmission of the first word. The message transmission end signal becomes "1" simultaneously with the transmission of the mth word. The message transmission start signal and the message transmission end signal enable the network to determine the start and the end of each message that is transmitted.

Signal lines 10X, 11X, 12X through 20X are for transmitting messages from the processors and the host computer to respective message controllers 100, 200, 300 and 400 in the network, and each also consists of three types of signal lines. Likewise, the signal lines 122X, 222X, 322X and through 422X transmit messages from message controllers 100, 200, 300 through 400 to switches 60, 61, 62 through 63. The signal lines 60X, 61X, 62X through 63X are for transmitting messages from the switches 60-63 to the processor PE(1) 10, processor PE(2) 11, through processor PE(n) and host computer 20, and are also each comprised of three types of signal lines.

The message controller 100 sends the destination processor number set at field A of the first word of the message to switch controllers 50-53 through a signal line 105A, and sends the message via a signal line 122X to the switches 60-63. The signals input to the other message controllers 200-400 are of the same type except that they come from different sources. The switch controllers 50-53 produce control signals for controlling message selection at the corresponding switches 60-63. Each switch controller recognizes the destination processor number it receives from the message controller and, when the destination processor number is that of the associated processor, controls the switch to select the message. When two or more destination processors are in contention for message selection, the message is transmitted to the processors in the order of arrival at the switch controllers.

The switches 60-63 are circuits for selecting messages received from the message controllers 100-400 in accordance with the control signals received from the switch controllers 50-53. Messages selected by each switch 60-63 are sent to the processors PE(1) 10 and PE(2) 11 through PE(3) 12 and the host computer 20 via the signal lines 60X-63X.

In the present embodiment, when transmitting a message from PE(1) 10 to PE(2) 11, the switch controller 51 controls the switch 61 for selecting the message sent from the message controller 100 via the signal line 122X. The switch 61 selects the signal line 122X and outputs the message to the signal line 61X. At this time, the other switch controllers 50, 52 and 53 control the switches 60, 62 and 63 so as not to select the signal line 122X.

Figure 4:
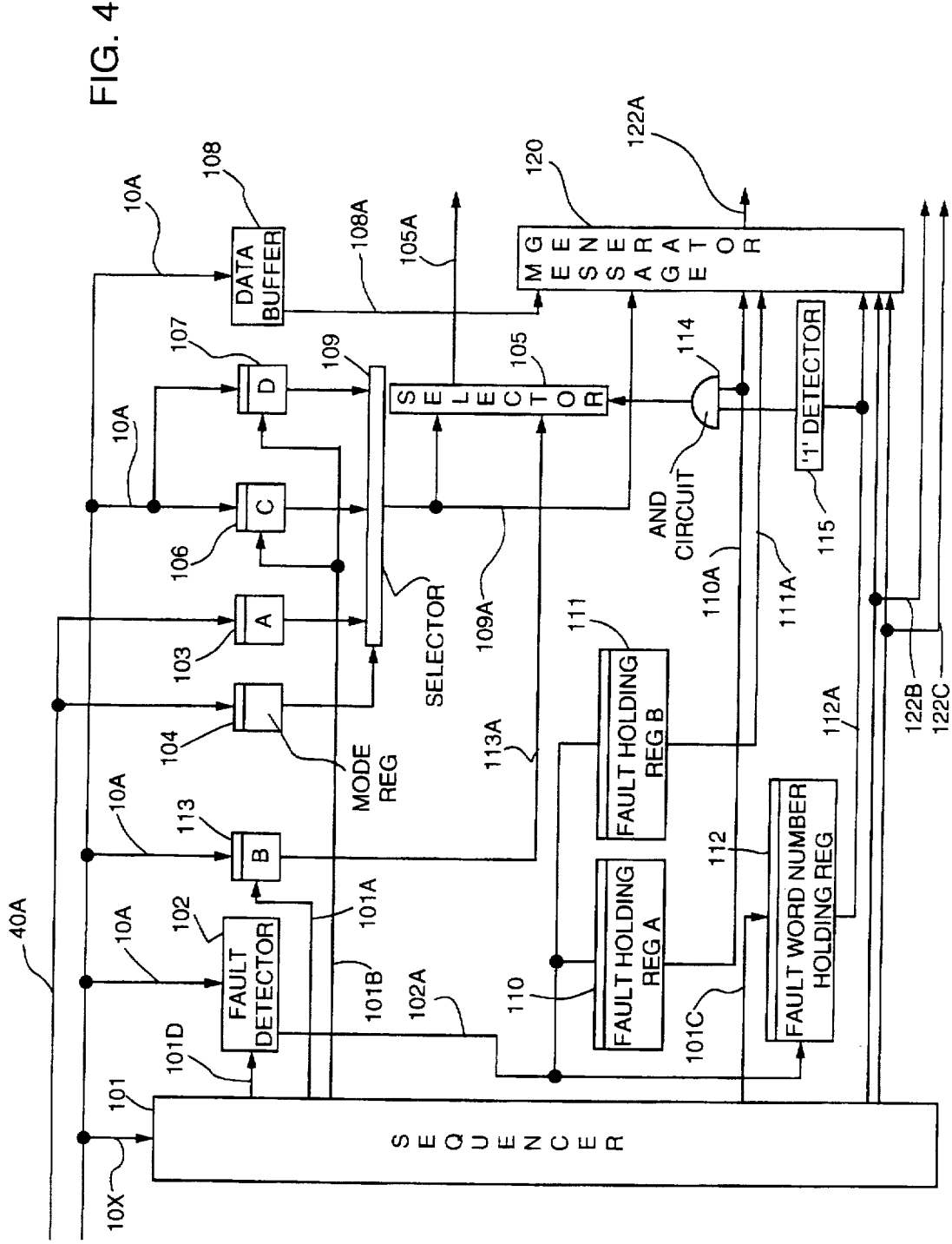
FIG. 4 is a diagram of the message controller used in the first embodiment of the invention.
Figure 7:
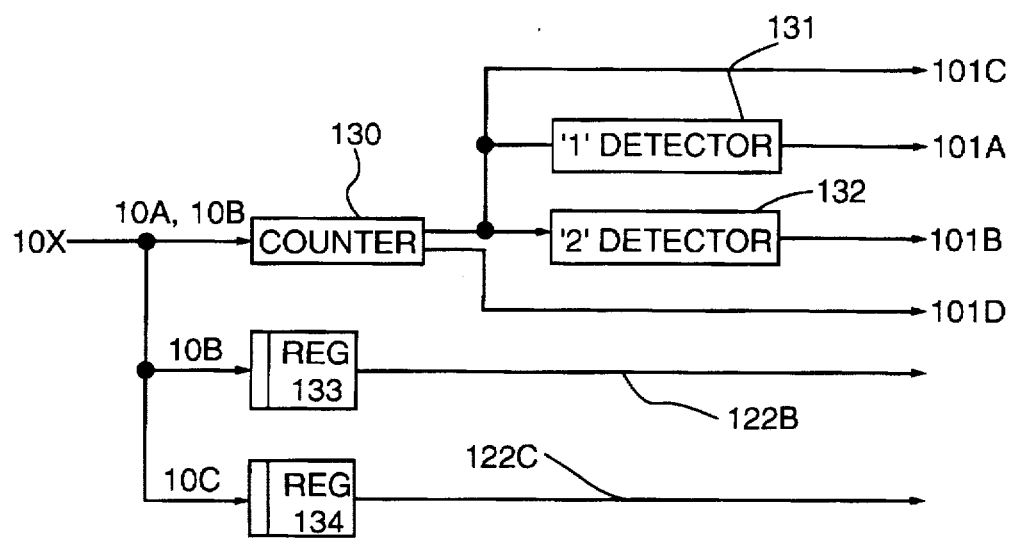
FIG. 7 is a diagram of the sequencer 101 of FIG. 4.

FIG. 4 is a diagram showing the configuration of the message controller 100. The signal line 10X inputs signals to a sequencer 101, which is shown in detail in FIG. 7. The start signal of a message transmission resets the sequencer, which has an internal counter 130 that is incremented by one each time a word is transmitted over signal line 10A for message transmission. When the counter 130 value is "1", which is identified by a "1" detector 131, the first word is considered to have been transmitted and a destination processor number contained in field A of the message is sent as a signal along signal line 101A to register B 113. When the counter value is 2 as identified by '2' detector 132, i.e. when the second word has been transmitted, a signal indicating the source processor number is sent along signal line 101B to a register C 106 and another signal is sent along line 101B indicating the substitute destination processor number used in the occurrence of a fault that is determined from field B of the message to a register D 107. The counter 130 of the sequencer 101 outputs a value at this time to a signal line 101C. A signal line 122B and a signal line 122C respectively are responsive to inputs on the signal line 10B and the signal line 10C to output the message transmission start and the message transmission end signals have the timing shown in FIG. 2, in synchronization with the message transmission sent over message transmission line 122A.

A fault detector 102 receives the message transmitted on signal line 10A as an input and provides an output on signal line 102A when a fault is detected in any of the fields of the message being transmitted. The output on signal line 102A sets a fault holding register A 110 to "1" when a fault is detected in field A and sets a fault holding register B 111 to "1" when a fault is detected in field B. Furthermore, when a fault is detected, the number of the word is sent from the sequencer 101 via signal line 101C to be stored in a fault word number register 112, regardless of the field in which it is detected. After the transmission of a message has been completed, the fault holding register A 110 and the fault holding register B 111 are reset in preparation for the transmission of the next message.

The network has a data buffer 108, as shown in FIG. 4 for example, which is the circuit for holding data until the message has been read. A register A 103 is provided as a circuit for holding the substitute message destination at the time a fault occurs. The substitute message destination is sent from the service processor in advance. Similarly, a mode register 104 is also provided for holding a mode bit for controlling a selector 109 that selects the substitute message destination during fault occurrence.

FIG. 5 shows the relationship between the value held in the mode register 104 and the register selected by the selector 109. The register selected is A 103 when the mode register 104 is set to "0", C 106 when it is set to "1" and D 107 when it is set to "2". This function enables the treatment of the message at the time a fault occurs during message transmission to be appropriately set in accordance with the fault recovery method. The setting of the values held in register 104 differs according to the operating system design. The value can be set before job execution, for example, when the system begins operating. For example, in a mode wherein all of the messages are able to be retransmitted, mode register 104 is set at value "1" and all of the messages are returned back to the source processor when a fault occurs. Then, the destination processor number when a fault occurs is not used. In the case where some messages are retransmittable and others are not, mode register 104 is set to value 2 and messages are retransmitted where possible by the OS or host processor. If a specific processor is used to receive all messages as determined by the OS, mode register 104 is set to value zero and register A 104 is set to that specified processor number. Then, the destination processor number when a fault occurs is not used.

In this embodiment, mode register 104 is assumed to be set to value "2". In this case, '1' detector 115 outputs a "1" when a value of a fault word number register 112 is "1", and AND circuit 114 generates a logical AND from that output value and a value of a fault word number register 112. When AND circuit 114 outputs a "1", selector 105 selects signal line 109 when it has a value of "0", and selects signal line 113A when it has a value of "1".

The network also has a message generator 120 responsive to the occurrence of a fault for receiving the message from the data buffer 108 via signal line 108A. The message generator 120 adds a message to the fault information in accordance with the type of fault, as specified by the particular system.

Figure 6:
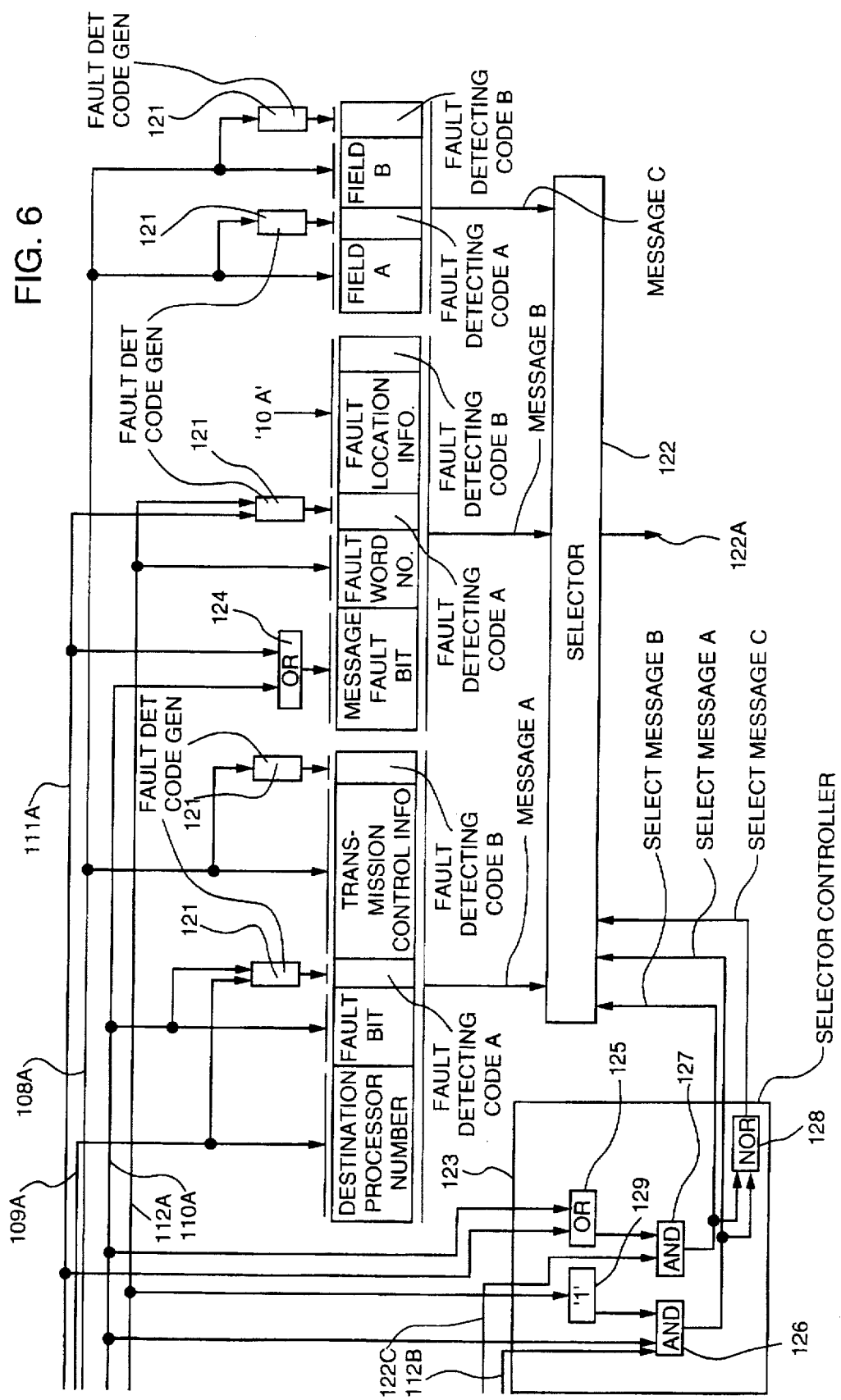
FIG. 6 is a diagram showing the message generating circuit 120 of FIG. 4.

FIG. 6 shows the configuration of message generator 120. A selector controller 123 controls a selector 122 in accordance with the value of the input signal. More specifically, if the value of signal line 110A is 1 (indicating that a fault was detected in field A), the value of the signal line 122B is '1', which is detected by the '1' detector 124, indicating a first word transmission cycle, and the value of the signal line 112A is '1', indicating that a fault was detected in the first word. In this case, selector 122 selects message A. If the value of the signal line 110 A is '1' (indicating that a fault was detected in the field A), or if the value of the signal line 111A is '1' (indicating that a fault was detected in field B) and the value of the signal line 122C is '1' (indicating the mth word transmission cycle), the output of OR circuit 125 becomes 1 and the output of AND circuit 127 becomes '1', so the selector 122 selects message B. In the other cases, it selects message C.

A fault detecting code generator 121 takes the exclusive-or (XOR) of all input signals and checks the parity.

However, a fault detecting code B for message A and message B is generated from only field B of the message sent from the data buffer 108 via the signal line 108A and, similarly, a fault detecting code A for the message C is generated from only field A. If no fault is detected, the generation of a new fault detecting code does not cause a logical contradiction. If after detection of a fault, the message is transferred with the fault intact, the same fault will be detected in the next transmission path making it impossible to unequivocally specify the place where the fault occurred. According to this invention, therefore, fault information is added to the mth word and a fault detecting code is again generated for a word in which a fault occurred before it is transmitted. Therefore, it is not possible to use the fields of the fault detecting code A and the fault detecting code B for the message sent via the signal line 108A. Incidentally, an OR circuit 125 is provided for generating the logical OR signal between the signal line 110A and the signal line 111A.

With reference to FIG. 6, the operation of the message generator is set forth as follows.

When no fault is detected in any word.

When no fault is detected in any word of the message, the input message is output without modification. In this case, the digital value of the signal on signal lines 110A, 111A and 112A are as follows during the message transmission.

Signal line 110A:=0 (no fault in field A)
Signal line 111A:=0 (no fault in field B)
Signal line 112A:=value 0 (reset upon message arrival)

In this case, message C is sent from the data buffer 108 via signal 108A, which is selected in output on the message transmission line 122A during every word transmission cycle.

When a fault is detected in field A of the first word.

In the case that a fault is detected in field A of the first word, an error is caused in the destination processor number and it is impossible to determine the destination processor as a result. In this case, the destination processor is replaced with an appropriate processor or the host computer. The digital value of the signals on the lines 110A, 111A and 112A are as follows during message transmission.

Signal line 110A:=1 (fault detected in field A)
Signal line 111A:=0 (no fault in field B)
Signal line 112A:=value 1 (fault detected in first word)

Accordingly, when message A is selected in the first word transmission cycle (122B=1) and the destination processor number is replaced with the substitute destination processor number received via the signal line 109A, the '1' on the signal line 110A is set in the fault bit field. As previously discussed, the destination processor number received via the signal line 109A is the one that is selected in accordance with the set value of the mode register that is set by the service processor during system set up. Specifically, the destination processor number is selected from one of the values in register A 103 (the message destination processor number at the time of fault occurrence set by the service processor), register C 106 (the source processor number) and register D 107 (the substitute destination processor number at the time of fault occurrence in field B of the second word of the message).

In the transmission cycles of the second word to the (m−1)th word, the message C is selected. In the case of the mth word, the message B is selected. At such time the message fault bit is set to '1' (indicating a fault somewhere in the message), the fault word number is set to '1' (indicating that a fault was detected in the first word) and information indicating that a fault has occurred on signal line 10A is issued as the fault location information.

A fault may also detected in field A of the first word in the case where the fault bit was mistakenly transmitted and there is no error in the destination processor number. However, since this case cannot be distinguished from a fault in the destination processor number, it is treated as a fault in the destination processor number. If it is desired to detect only faults occurring in the destination processor number, it would be sufficient to establish a fault bit in another word or in field B of the first word, rather than in field A of the first word.

In case multiple jobs are being executed in parallel, the present embodiment assures that occurrence of a fault within a message issued by one of programs belonging to one of the jobs will not affect execution of programs belonging to other jobs. For this purpose, it is desirable to transfer the message to a representative one of the processors PE(1) to PE(n) which is executing an OS which controls execution of the programs which belong to the particular job.

Such a representative processor depends upon the job. For example, if the first group of processors such as PE(1) to PE(i) (i is a positive integer greater than '1') are executing programs belonging to the first one of the jobs, the second group of processors such as PE(i+1) to PE(j) (j is a positive integer greater than i) are executing programs belonging to the second one of the jobs, and so on, and when the message is one transferred by a program being executed by one of the first group of processors, the message is transferred to a representative one of the first group of processors which is executing an OS for the first job.

If the message is one transferred by a program being executed by one of the second group of processors, the message is transferred to a representative one of the second group of processors which is executing an OS for the second job.

The representative processor for each job needs to hold a table which includes processors to which plural programs belonging to the job represented by the representative processor are assigned.

Alternatively, the message may be transmitted to the host processor 20, which knows to which job a program being executed by each processor belongs. For this approach, the host processor needs to hold a table which includes processors to which plural programs belonging to each job.

The first approach mentioned above in which the fault message is transferred to a representative processor of a group of processors is preferred over the second approach mentioned above in which the message is transferred to the host processor in that in the first approach plural messages that have been found as ones having a fault can be processed in parallel by plural representative processors.

Hereinafter the particular one of the processors PE(1) to PE(n) or the host processor 20 to which the message is transferred is referred to as a fault message processing processor. Such a fault message processing processor conducts the following at receipt of the message.

First, the processor checks if the destination processor number fault bit is one, and if the processor has found that the bit is one, it interrupts the CPU within the processor, so that a fault message processing routine is started. In case the transfer mode bit of the receives message is '1' which indicates that the received message is allowed to be transmitted, a re-transmit requesting message is transmitted to a source processor of the received fault message by this routine.

Information included in these re-transmit requesting messages has the following values: Destination processor number; the source processor number within the received message; Job ID (the job ID within the received message); Message ID (the message ID within the received message); and a Re-transmit request mode bit: '1'

When the source processor of the received message received this re-transmit request message and recognizes that the re-transmit request bit of this message is '1', the processor reads out from a local memory within the processor, an original message which is determined from the job ID and the messages ID included in the re-transmit request message. The source processor then re-transmits the read out message to the originally designated destination processor. If the received message is recognized to have a transfer mode bit value of '0', the fault message processing processor will transmit plural job cancel request messages each to one of a group of processors which are executing programs belonging to a job specified by the job ID included in the received fault message. Information included in this job cancel request messages represents the following: Destination processor number; a processor number of one of the group of processors which are executing programs belonging to the job; Job ID (the job ID within the received message); and a Job cancel request bit: '1'

The plural job cancel request messages can be transmitted to the group of processors sequentially. Each of the groups of processors which has received one of the job cancels request messages selectively sustains execution of a program being executed by that processor and belonging to a job designated by the job ID.

The fault job processor further informs the service processor 40 of fault location information by way of line 10Y, 11Y or 12Y. The location may be expressed by a serial number of an output port of the network 30 from which the fault message has been provided to the representative processor or by a serial number of one of the plurality of message controllers 100, 200 which has found a fault with a message passing through the network 30. A system operator can know the location within the network when the transmitted location is displayed in a display apparatus attached to the service processor.

Each processor includes a parity check circuit for checking a parity error of a destination processor field of a received message.

If parity error is found with the destination processor number, the processor executed the fault message even if the destination processor number bit is '0'. This fault has been induced during transfer of the received message from the network 30 to the fault message processing processor. The processing executed in this case is substantially the same as one explained for a case where the destination processor number fault bit of the received message is already '1'.

In the embodiment above, the re-transmit request message and the job cancel request messages can be generated by software or hardware, in various ways. For example, they can be generated by means of programs being executed by the fault message processing processor, or by means of a specific circuit which is dedicated for generation of those message and which is optionally included in CPU of the processor.

When it is more desirable to broadcast the job cancel request messages to the group of processors mentioned above, a network for use in a parallel processor system which enables partial broadcast of the same messages to a selected group of processors within the system is used. Such a network is disclosed in co-pending U.S. application Ser. No. 07/916,630 filed on Jul. 22, 1992, the disclosure of which is incorporated herein by reference. The present embodiment can be modified so that the various circuits employed in the above-mentioned application are similarly employed in the present embodiment to enable execution of the partial broadcast.

When a fault is detected in field B of the first word.

When a fault is detected in field B of the first word, it is determined that an error occurs in the transmission control information. In this case, even though a fault is present in the first word, there is no error in the destination processor number. The fact that the error is therefore added to the message and the message is transmitted to the processor indicated by the destination processor number. In this case, the digital states of the signal lines 110A, 111A, and 112A are as follows during message transmission.

Signal line 110A:=0 (no fault in field A)
Signal line 111A:=1 (fault detected in field B)
Signal line 112A:=value 1 (fault detected in first word)

In this case, message C is selected in the first word transmission cycle (122B=1), the destination processor number is not replaced and the fault bit A11 is held at zero. A fault detecting code B is generated for the transmission control information where the fault was detected, and this information is added to the message.

Message C is selected in the transmission cycles of the second word to the (m−1)th word. In the mth word transmission cycle (122C:=1), message C is selected. At such time the message fault bit is set to 1, indicating a fault occurred somewhere in the message, the fault word number is set to 1 (indicating that a fault was detected in the first word) and information indicating that a fault has occurred on signal line 10A is issued as the fault location information.

Since a distinction is made regarding the detecting of a fault in the first word based on the fact that it was detected in field B as opposed to field A (destination processor number), the message is sent to the destination processor designated by the source processor. As a result, fault recovery can be achieved without requiring communication with the host computer or other processors that have no relation with the message transmission. This improves the fault handling and recovery efficiency of the system.

When a fault is detected in other than the first word.

When a fault is detected in other than the first word, the fault does not cause an error directly affecting the destination of the message. Since in this case, as in the foregoing case where a fault is detected in field B of the first word, there is no error in the destination processor number. The fact that a fault was detected, therefore, is simply added to the message and the message is transmitted to the processor designated by the destination processor number. In this case, the states of the signal lines 110A, 111A and 112A are as follows during message transmission.

Signal line 110A or signal line 111A:=1 (fault detected somewhere);

Signal line 112A:=value k (fault detected in the kth word, k not equal to 1).

Message C is selected in this case in the transmission cycles of the first word to the (m−1)th word cycles. A fault detecting code that is generated regarding the kth word (where k is a word identifying number) in which the fault was detected is added to the message.

Message B is selected in the transmission cycle of the mth word. At such time, the message fault bit is set to 1 (indicating a fault somewhere in the message), the fault word number is set to k (indicating that a fault was detected in the kth word) and information indicating that a fault had occurred on signal line 10A is issued as fault location information.

In summary, for further cases involving no error in the destination processor number, the message is sent to the destination processor designated by the source processor. In the case where a fault is detected in field A of the first word, an error is determined to be present in the destination processor number. Therefore, the message is transferred to an appropriate processor or the host processor in accordance with the value of the mode register.

As explained beforehand, in accordance with the invention, when a fault is detected in the course of message transmission, a response is made according to the nature of the fault either by transmitting the message to a different destination processor or by adding information concerning the fault to the message, whereby suspension of transmission can be avoided and transmission to an appropriate destination processor can be completed without degrading the efficiency of the system.

Embodiment 2

Figure 8:
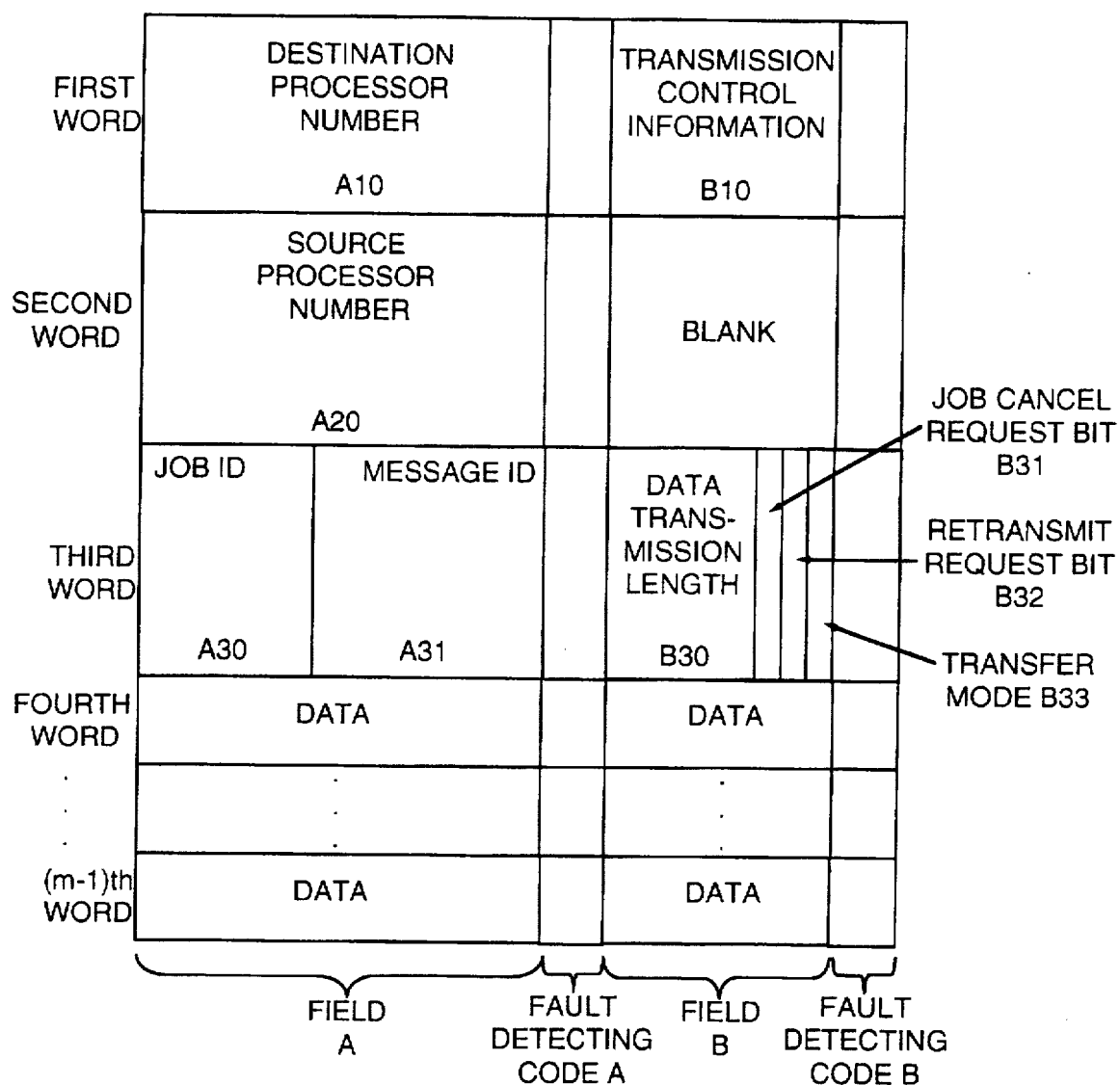
FIG. 8 is a diagram showing the format for a message transmitted over the system network according to a second embodiment of the invention.

In the second embodiment of the invention, a different message format is used when messages are transmitted over the network. The message uses a format that is shown in FIG. 8, which differs from the message format shown in FIG. 3 in that no substitute destination processor number is required to be specified in the message. Accordingly, field B of the second word is left blank. Further, since no such substitute destination processor number is used, the message controller circuitry is simplified, as will be explained with reference to FIG. 9, hereinafter.

According to this embodiment, when a fault occurs in the destination processor number when the message is being transmitted, the message is forwarded to a predetermined processor in the network, for example PE(1).

The functions performed by the message controller are reduced according to this embodiment by having the predetermined processor that receives faulty messages with an error in the destination processor number send a retransmit request to the source processor, rather than by the message controller. Accordingly, the destination processor number fault bit in the first word and the message fault bit as well as the fault word number in the mth word are omitted from the message format, as shown in FIG. 8 as compared with that of the format as shown in FIG. 3.

Figure 9:
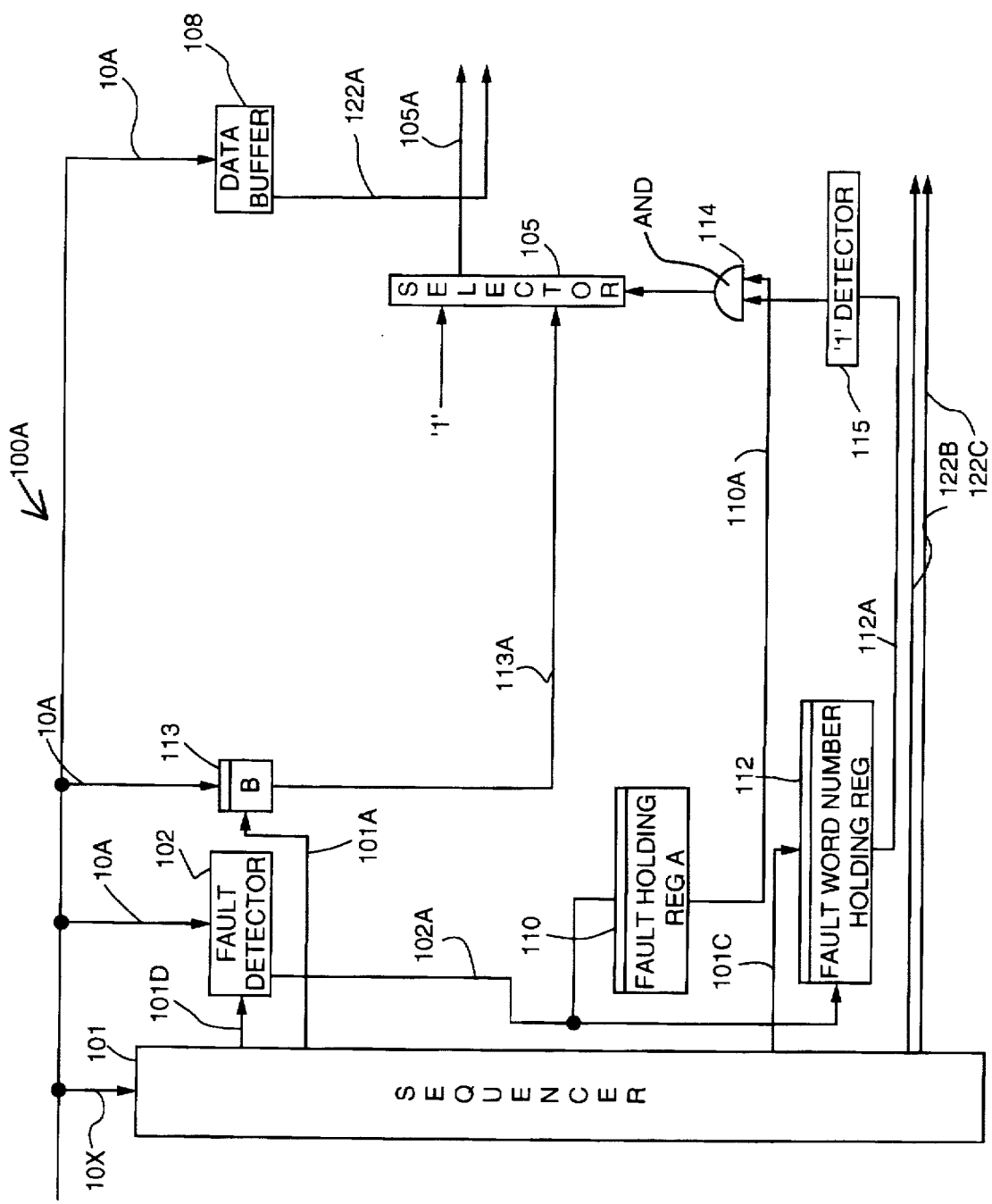
FIG. 9 is a diagram of the message controller according to a second embodiment of the invention.

FIG. 9 is a diagram of a message controller 100A constructed according to the present embodiment, wherein components identical to those of the first embodiment are assigned like reference numerals. Also, as with the first embodiment, it is assumed that a plurality of jobs are executed by multiple processors in the system and that the relationship between the execution of the jobs and the multiple processors is the same as that in the first embodiment.

When a processor sends out a message, the value of a fault detecting code A is determined for each word in the message such that information in field A and the fault detecting code together provide a specified parity, as in the case for the first embodiment. The same is also true for the fault detecting code B for each word.

The message controller 100A has a simpler construction than that of the first embodiment shown in FIG. 4 in that since the substitute destination processor number is eliminated from the message, there is no mode register 104, register A 103, register C 106, register D 107 and selector 109. Further, because the fault bit A11 of a first word and the entire m-th word fault information are not included in the transmitted message for this embodiment, there are no items in these fields of the message that require alteration in the event of fault detection therein, thereby simplifying the construction of the message generation circuit 120.

When a message is processed by the message controller 100A, the destination processor number A10 in the field A of the first word in the message is set in the register 113, which is then transferred to the selector 105 across line 113A. If it is determined that a fault has occurred in field A of the first word indicating that an error appears in the destination processor number, then the message is transmitted to PE(1). As a result, the selector 105 is provided with an input '1' which is the number of this processor.

When the fault detector 102 detects a fault in field A of the first word in the message that is being transferred, the AND circuit 114 goes high, as in the first embodiment, causing the selector 105 to select the '1' input for outputting this number as an indication of the destination processor to which the message containing a fault is to be forwarded. The output is sent along signal line 105A.

Fault detector 102 in the message controller checks to see if there is a parity error within field A of the first word in the message supplied, as in the first embodiment. If a parity error is found in this field, the register 110 is set with a '1', as in the first embodiment, and the register 112 is set with the number of the word in which the fault occurs, "1". The contents of the register 110 are sent to the AND circuit 114 across the line 110A. When register 112 is set to "1", the 1-detector circuit 115 produces an output of '1' thereby causing the output of the AND circuit to go high. The selector 105 then selects either the one that is a constant input or the contents of the register 113 according to whether the output of the AND circuit is high or not.

When the fault detector 102 does not detect a fault, the output of AND circuit 114 is low, thus causing the selector to select the destination processor number set in register 113. The selected destination processor number, whether PE(1) in the case of a fault occurring in the first word or the destination processor number A110, is output on signal line 105A to a plurality of switch controllers 50, 51 that are provided in one to one correspondence with output ports of the network. These switch controllers perform control so that a switch of the input/output port corresponding to the destination processor number selected by the selector 105 picks up the message. Accordingly, the message is either transferred to the processor PE(1) or the destination processor number specified in the message.

Unlike in the first embodiment, the fault handling system of the second embodiment does not rewrite the fault detecting code A or B in the message even when the fault detector 102 detects a fault in one of the succeeding words.

When the processor PE(1) receives a message, it determines if there is any fault in the combined data consisting of the information in the field A or B of each word with the fault detecting code A or B added thereto in order to decide whether each has a fault. Then, the processor transfers the decision result along with the message received to a processing device (not shown) for fault recovery. In other words, the processor PE(1) has a parity checking circuit for detecting errors in fields A and B of each word in the message.

The processing device that receives the parity check message from the processor PE(1) processes the message according to a program depending on whether the parity check result on the fields of each word in the received message indicates the fields have an error or not.

When a message has an error in the destination processor number.

When a message has an error in the destination processor number, it is forwarded to the processor PE(1). Then processor PE(1) executes the following processing.

When the transfer mode bit B33 in the third word of the message is set for retransmission, the processor PE(1) sends a message requesting retransmission of the faulty message to the source processor whose number is identified by entry A20 in the message. The retransmission message that is sent includes the received job ID A30 and message ID A31 and a retransmission request bit B31 set at "1".

If the transfer mode bit B33 inhibits retransmission of the faulty message that is received( for example if the message is not retained in the source processor and therefore unavailable for retransmission), the processor PE(1) sends a message requesting job cancellation to a processor that manages the job specified by the job ID in the faulty message. The relationship between the processor numbers and job IDs is stored in the processor PE(1), since this processor is designated by the system to receive all faulty messages. The message for job cancellation contains the job ID A30 and message ID A31 and a job cancellation request bit B31 of "1". Further, the processor PE(1) informs the host processor of the faulty message and thereby notifies the system management program executed by the host processor of the occurrence of a fault.

The processor that receives the message calling for job cancellation then sends a message requesting the halting of a program under execution to a plurality of processors currently executing programs that belong to the job specified by the job ID contained in the message.

The above sequence is carried out when the decision circuit decides that no fault exists in field A of the second word and in field A and B in the third word. When any of these fields is found to contain an error in addition to the error in the destination processor number, this sequence of processing is not performed. In practice, however, the likelihood of multiple errors occurring in this manner is slight, so if an error in any of the three fields (field A of the second word and fields A and B of the third word) exists in addition to the destination processor number error, selection is made of an executable processing based on the information contained in the one or more of the fields having no error. For example, when an error is contained in the source processor number in the field A of the second word, the received faulty message is informed to the host processor 20 to notify the system management program being executed by the host processor 40 of the occurrence of a fault even if the fields A and B in the third word are both without error.

When a message has no error in the destination processor number.

When no error is found in the destination processor number the message controller then checks to determine if the number matches the processor PE(1). If the destination processor number A10 contained in the first word in the received messages without error and also matches the number of the processor PE(1), the following steps are performed.

In this case, the message is considered to be correctly sent to the processor PE(1) so that this processor can process data contained in the fourth to (m−1)th word in the message. If, however, the original destination processor number contained in the message differs from PE(1), but the two bits in the original number are inverted by error during the transfer of the message, making the destination processor number after the error match the PE(1) number by chance, the altered destination processor number is not detected as faulty by the parity check. This case is not distinguishable from the case mentioned above, however, and it is assumed that the possibility of such an occurrence of multiple errors is low.

Such multiple errors may occur and be processed by using an ECC code as the fault detecting code A in the message and using the ECC circuit as the decision circuit. In this case, since the errors of up to two bits can be corrected, it is possible to make an error check despite the inversion of two bits in the destination processor number.

When the destination processor number A10 in the first word of the received message is correct and does not match the processor number PE(1), the following steps are taken. If the message is correct, such a message cannot arrive at processor PE(1). Hence, this message is processed in the same manner as in the case of a faulty message according to the case of when a message has an error in the destination processor number.

Embodiment 3

In the third embodiment of the invention, a different network construction is utilized in place of the networks of the preceding embodiments. Such a network is disclosed in Japanese Laid-Open Application No. 124162/1988, for example, which consists of a plurality of interconnected local networks. The same type of network is also disclosed, for example, in U.S. patent application Ser. No. 07/916,630 filed on Jul. 22, 1992 by Ogata et al and application Ser. No. 08/034,359 filed on Mar. 19, 1993 by Shutou et al, which applications are herein incorporated by reference. This plurality of interconnected local networks are designed for transferring messages among many processors at high speed.

Figure 10:
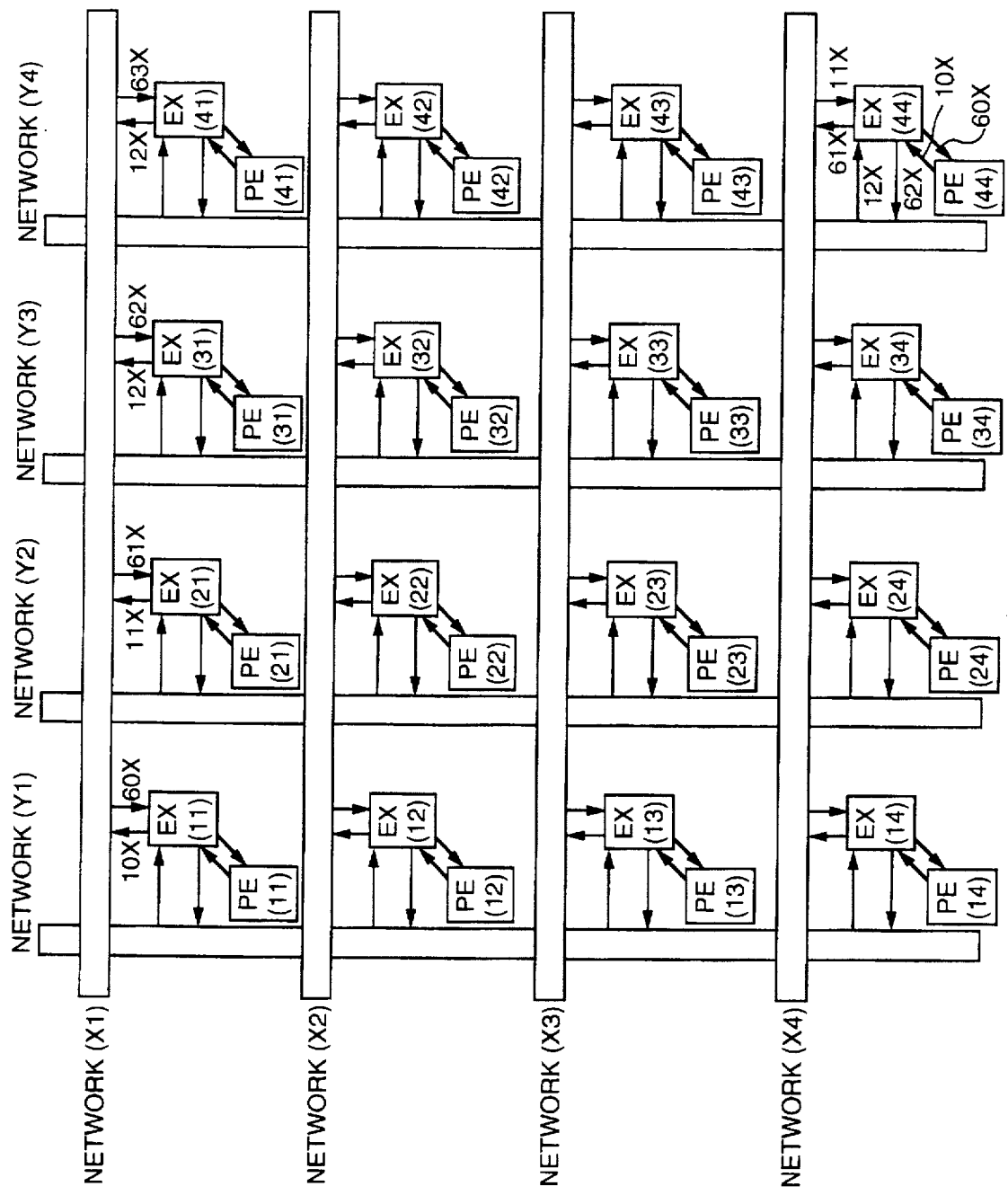
FIG. 10 is a diagram of a system having a plurality of processors and a fault recovery capability according to a third embodiment of the invention.

FIG. 10 shows the configuration of a parallel computer having the above-mentioned network. A plurality of processors (16 in total) PE(11) to PE(44) are arranged in a two-dimensional configuration and interconnected by an X-direction cross bar network (X1 to X4), a Y direction cross bar network (Y1 to Y4), and relay switches EX(11) to EX(44). The host processor 40 and service processor, both used in the first embodiment, are considered to be used in the system of this embodiment, but are not shown.

Each of the crossbar networks is similar to the network used in the first embodiment, and has multiple pairs of input/output ports for parallel transfer of messages among them. The input/output ports are each connected to one relay switch. Each of the processors has a two-dimensional address (YX). The X-direction crossbar networks X1 to X4 are provided for corresponding X coordinates 1, 2, 3 and 4 whereas the Y-direction crossbar networks (Y1 to Y4) are provided for corresponding Y coordinates 1, 2, 3 and 4. Relay switches EX (ij) are provided for each combination of one Y-direction crossbar network Yi (i=1–4) and one X-direction crossbar network Xj (j=1–4). These relay switches are connected to the input/output ports of the crossbar networks and the processors PE(ij). In other words, the relay switches are related to pairs of one Y-direction crossbar network and one X-direction crossbar network.

The Y-direction crossbar network is a local network that has the X-coordinate address of i and which interconnects multiple processors PE(i1) to PE(i4); and the X-direction crossbar network Xj is a local network that has the Y-coordinate address of j and which interconnects multiple processors PE(1j) to PE(4j). This network performs message transmission among the processors as follows.

When, for example, processor PE(12) sends a message to another processor PE(43), which differs from the sender processor in both the X and Y coordinates, the sending processor PE(12) supplies a message containing a destination processor number (43) to its corresponding relay switch EX(12). The relay switch EX(12) sends this message first to the lateral crossbar network X2, and the message is then transferred from the input/output port connected to the Y coordinate of 4 contained in the destination processor number in this message to a relay switch EX(42). This relay switch EX(42), when it decides that the X coordinate of 3 contained in the destination processor number differs from its own X coordinate, transfers the message onto the Y direction crossbar network Y4. Then, the message is transmitted to relay switch EX(43) through an input/output port having the X coordinate of 3 contained in the destination address in the message. The relay switch, when it decides that the X and Y coordinates of the message destination address agree with those of its own address, transfers the message to the processor PE(43). In this way, the network uses X and Y coordinates for the destination address for the message and transfers the message to a destination processor through the network. The transfer of the message is accomplished by creating a passage through the network which includes a first relay switch connected to the sender processor, one X direction crossbar network connected to the first relay switch, one Y direction crossbar network connected to a second relay switch that corresponds to the destination processor, and the second relay switch. When a processor PE(11) sends a message to another processor which has the same Y coordinate, for example PE(14), a relay switch EX(11) transfers the message onto a Y direction crossbar switch Y1, which is common for both of these processors. Then the message is sent via relay switch EX(14) to the destination processor PE(14).

In this way, the network has a fewer number of transfers among local networks than do other known networks such as those constructed with a mesh or torus architecture, and the advantage of the present network is high efficiency and high capability for high speed transfer of messages to remote processors.

In this embodiment, the X-direction crossbar networks, Y-direction crossbar networks, relay switches and processors are fabricated in a single LSI. Hence there is a possibility that errors may occur in a message when the message is transferred on signal lines interconnecting these components. As in the first and second embodiments, it is presumed that a plurality of programs belonging to a plurality of jobs are executed in parallel by a plurality of the processors of the system. Two or more processors with the same X coordinates but differing Y coordinates may belong to a single job group that executes a plurality of programs belonging to the same job. Alternatively, two or more processors with the same Y coordinates but different X coordinates may form a job group that executes a plurality of programs belonging to the same job. It is also possible to form a job group that consists of a plurality of processors whose X and Y coordinates fall in specified ranges, and which executed a plurality of programs belonging to the same job.

In this embodiment, when it is decided that there is a fault in the destination processor number contained in a message, which was supplied to an X-direction crossbar switch, X1 for example, from some relay switch, the message will be transferred through a specific relay switch, EX(11) for example, which is connected to and selected for the X-direction crossbar switch X1, and further to a specific processor PE(11) connected to that relay switch EX(11). According to this embodiment, the relay switch EX(11) is chosen since it has the smallest Y coordinate among the 4 relay switches connected to the crossbar network.

When it is decided that there is a fault in the destination processor number contained in a message supplied on an Y direction crossbar switch, X4 for example, from some relay switch, the message will be transferred through a specific relay switch, EX(41) for example, that is connected to and selected for the Y direction crossbar switch Y4, and then to a specific processor PE(41) connected to that relay switch. The relay switch EX(41) is chosen since it has the smallest X coordinate among the four relay switches connected to the crossbar switch.

Subsequent processing to be performed for a message containing a fault that is transferred to the specific processors according to the above examples is essentially the same as that which is performed for messages containing a fault as set forth in the second embodiment.

Figure 11:
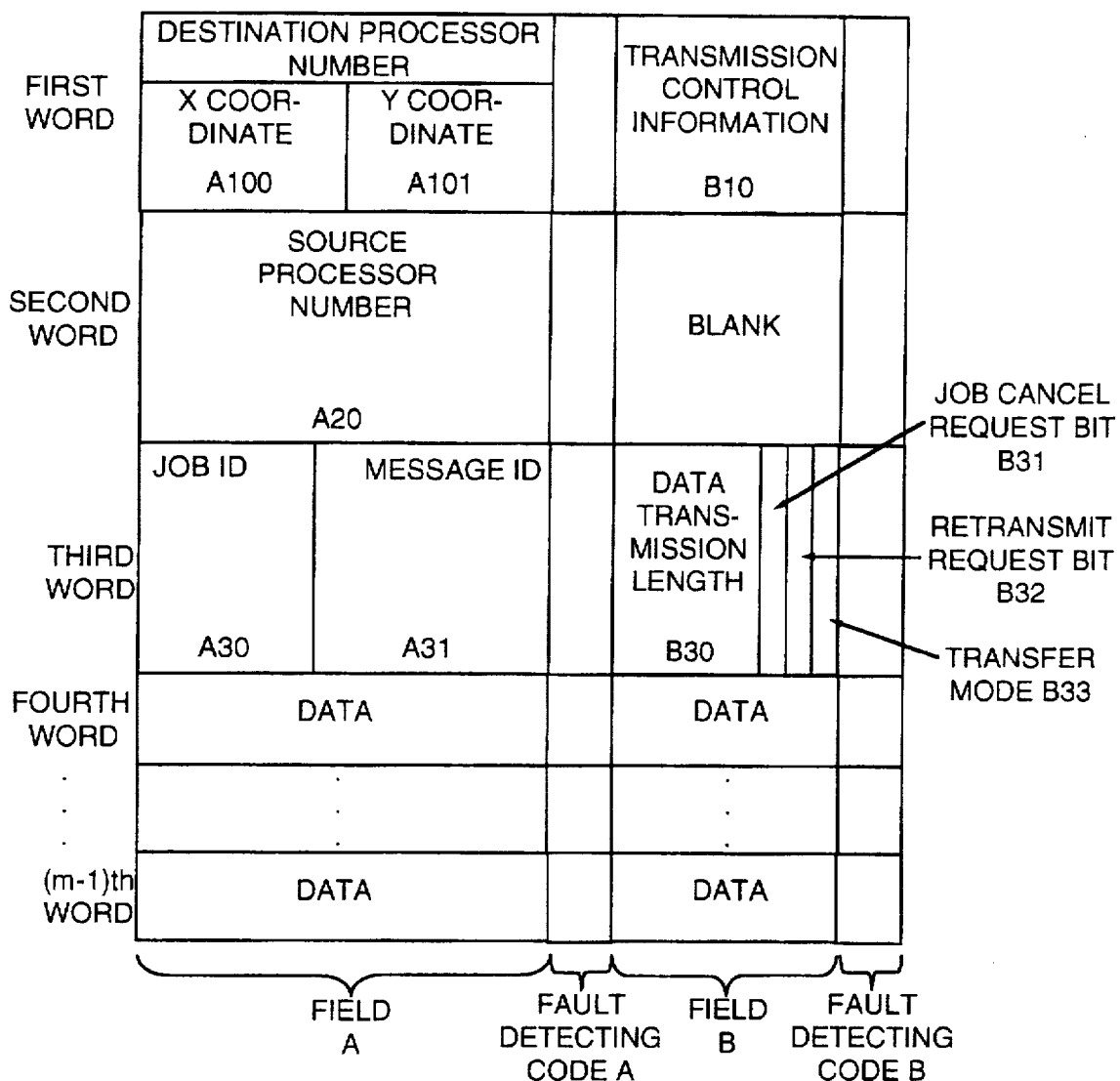
FIG. 11 is a diagram of the format of a message transmitted over the network of the system configured according to the third embodiment of the invention.

The format of a message used in this embodiment is shown in FIG. 11. This format differs from that of the second embodiment shown in FIG. 8 in that field A of the first word includes X coordinate A100 and Y coordinate A101 for designating the destination processor number.

The X-direction crossbar and Y-direction crossbar networks have a similar configuration as the network 30 shown in FIG. 1, except for the internal configuration of the message controllers 100, 200 and their connection with the host processor 20 and service processor 40. It is not necessary that the X or Y direction crossbar networks be connected directly to the host processor, since this connection may be made indirectly through an appropriate passageway. Such an indirect connection is also suitable for connection of the crossbar networks to the service processor.

Figure 12:
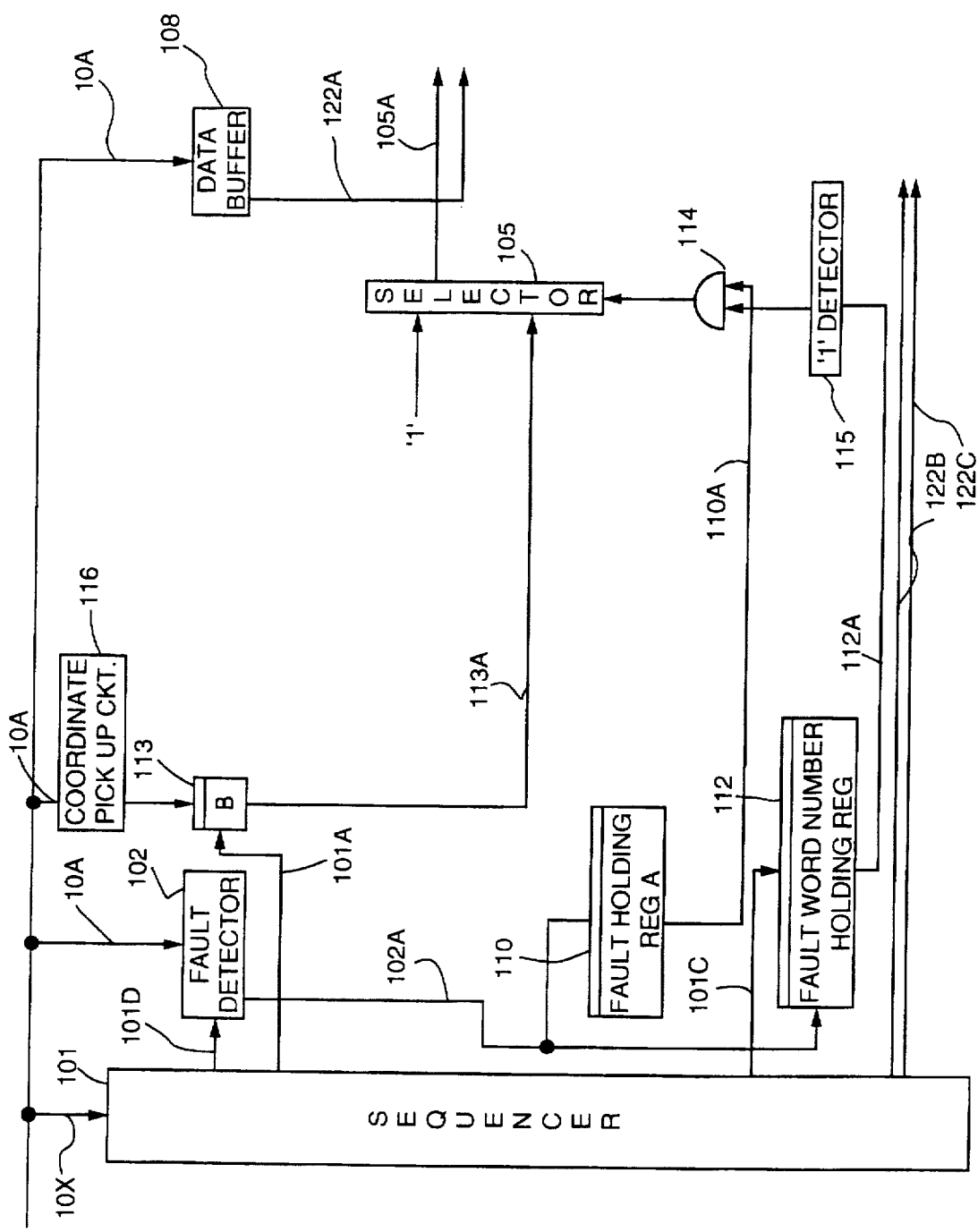
FIG. 12 is a diagram showing the message controller contained in the x-direction crossbar network and the y-direction crossbar network, according to the third embodiment of the invention.

The internal configuration of the message controllers used for the crossbar networks in this embodiment is similar to that of the second embodiment, but partially modified with respect thereto, as shown in FIG. 12. The message controller shown in FIG. 12 differs from the one shown in FIG. 9 in that a coordinate pickup circuit 116 is added to the circuit.

The message controllers for the crossbar networks determine the output ports to which the messages they receive are to be transferred, only from the corresponding X coordinate and from the corresponding Y coordinate, respectively, of the destination processor coordinate contained in the message.

The coordinate pickup circuit 116 in the X-direction crossbar network picks up the X coordinate from the message received by the message controller to which the circuit 116 is connected, and then feeds it to the register B113. Similarly, the coordinate pickup circuit 116 in the Y direction crossbar network determines the Y coordinate from the message and then sends it to the register B113. The coordinate held in the register B113 is entered into the selector 105, which is also supplied with an input of a constant ('1') as the output destination of the message at the time of an occurrence of a fault in order to send the message to the number one port when a fault is detected in the field A of the first word in a message.

The fault detector 102 in the message controller, as in the first and second embodiments, determines if there is a parity error in field A of the first word of the message supplied, and if one is found, the output of the AND circuit 114 goes high. The selector 105 then selects either the constant input '1' or the contents of the register B113 depending on whether the output of the AND circuit is high or low.

When the fault detector 102 does not detect any fault, the selector 105 selects the address of the output port contained in the register B113. When a fault is detected, the constant "1" is selected. The selected port address is output on signal line 105A to three switch controllers that correspond to the three input/output ports in the relay switches. These switch controllers control the switching of the input/output ports so that the destination port address that is selected by the selector 105 receives the message.

In this embodiment, the relay switches such as EX(11) have basically the same configuration as in the network 30 of FIG. 1, except for the number of input/output ports. That is, the number of input/output ports of each relay switch is 3, as seen in FIG. 10. However, no relay switches are directly connected with the host processor nor with the service processor, so the internal configuration of the message controllers 100, 200 and their connections with the host processor and service processor are different in this embodiment as compared with the first and second embodiments.

Figure 13:
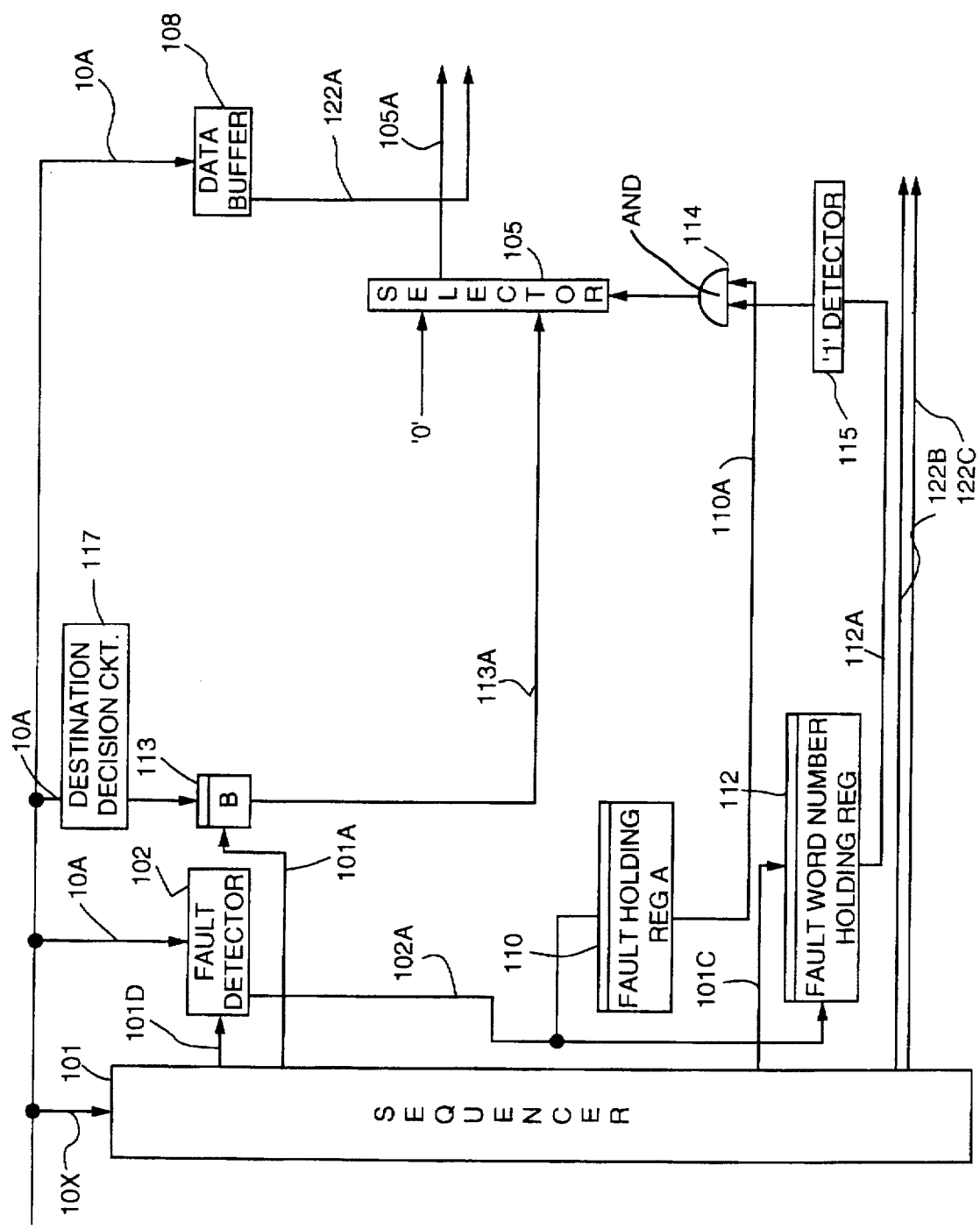
FIG. 13 is a diagram of the message controller contained in the relay switches according to the third embodiment of the invention.

The internal configuration of the message controller used in each relay switch, as shown in FIG. 13, differs from the controller shown in FIG. 12 in that a destination decision circuit 117 is used instead of the coordinate pickup circuit 116. The destination decision circuit includes a register (not shown) for holding the X and Y coordinates of the processor connected to the relay switch; a comparison circuit (not shown) for comparing the X and Y coordinates as the destination processor number contained in the message that was input to the message controller to which the circuit 117 belongs and the processor coordinates held in the register; and a circuit (not shown) that determines the address of a port to which the message is to be output.

This embodiment makes the following assumptions regarding the address of the input/output ports for each relay switch. The input/output port connected to the processor is assigned an address of "0"; the input/output port connected to the Y-direction crossbar network is given an address of "2"; and the input/output port connected to the X direction crossbar network is given an address of "1".

The destination decision circuit 117 outputs the address "0" of the input/output port connected to the processor when the comparison has found that both of the X and Y coordinates in the received message match those of the processor. When only the X coordinates of these addresses agree, the destination decision circuit 117 produces the address "2" of the input/output port connected to the Y direction crossbar switch to which the relay switch is connected. Then only when the Y coordinates of these addresses agree or when neither X coordinates nor Y coordinates agree, the destination decision circuit 117 outputs the address "1" of the input/output port connected to the X-direction crossbar switch for that relay switch. The value representing the output destination is retained in the register B113 and then sent to the selector 105.

The selector 105 is supplied with a constant input of "0" that is selected and output on signal line 105A when a fault is detected by fault detector 102 in the destination processor number of the message received by the message controller. When no fault is detected, selector 105 selects the address of the output destination port contained in the register B113. The output address sent on line 105A is received by three switch controllers that correspond to the three input/output ports in the relay switch. The switch controllers perform control of the switching of the input/output ports so that the output destination port address selected by the selector 105 picks up the message.

As a result, the fault-related processing of a message containing a fault is possible even though the message controller of this embodiment is smaller in scale (as to the number of logic components) than the first embodiment.

An example of transmitting a message over the network will be explained with reference to transmitting a message from PE(12) to a processor PE(34). The message destination has an X coordinate A100 of 3 and a Y coordinate A101 of 4, and is transferred by relay switch EX(12), the X-direction crossbar network X2, the relay switch EX(32), the Y direction crossbar network Y3, and the relay switch EX(34). The message controller for the port of the relay switch EX(12), to which the processor PE12 is connected, makes a comparison with the destination circuit 117 between the X coordinate 1 of processor PE(12) and the X coordinate 3 of the destination processor PE(34), and similarly between the Y coordinate 2 of the source processor and the Y coordinate 4 of the destination processor. Incidentally, the comparison values are held in the destination circuit 117 after being determined.

In this example, since neither the X nor Y coordinates agree, the destination decision circuit 117 outputs the value of 1 that is set in register B113. If there is no fault in field A of the first word, the selector 105 selects the value from B113 which is then sent on signal line 105A to the switch controllers that perform control to transmit the selected value to the X-direction network X2. When a fault is detected and the output of the AND circuit 114 is high, the value "0" is selected and the switch controllers send the selected value to the processor PE(12). This permits the message having a fault contained therein to be transferred to the processor.

In the message controller for the port in the X-direction crossbar network X2, to which the relay switch EX(12) is connected, coordinate pickup circuit 116 takes the X coordinate value of 3 contained in the message and sets it in the register B113. When there is no fault in the field A of the first word, the value 3 is selected and output on line 105A so that the switch controller sends it to relay switch EX32. When a fault is found in field A, the output of AND circuit 114 goes high and the selected value "1" is sent to the relay switch EX(12). This permits the message having a fault contained therein to be transferred to the relay switch, and through the relay switch to the appropriate processor.

While an example of the embodiments of the invention has been explained in the foregoing description, other variations of the embodiments are possible.

For example, it is possible to adopt a message format for the first embodiment that does not specify the substitute destination or forwarding processor number B20 that is used when a fault occurs in the message. Also, in the first embodiment it is possible for the service processor to specify in the register A103 the substitute destination processor number to which the message is to be forwarded at the time of the occurrence of a fault, thus permitting the substitute destination processor number B20 to be omitted from the message.

In each of the three embodiments of the invention discussed herein, the retransmission request is sent to the message sending or source processor, but this is an optional technique for handling fault recovery, and it can be omitted.

Also, in each of the embodiments a parity bit is used to detect a fault in the message, but it is equally effective to use an ECC code to correct one bit errors and also to detect when two or more bits are in error.

In the third embodiment, a processor at one end of each crossbar network is designated as the processor to which the faulty message is to be forwarded. It is possible, however, to select one particular processor from among all of the processors in the network as the processor that receives the forwarding of a message containing a fault therein. For example, such a processor may be PE11, located at one end of the network.

In the second or third embodiments of the invention, the processor that receives a message having a fault in the destination processor number, for example, PE(11), sends the message to a program managing the execution of the jobs that request the cancellation of execution of the job to which a program currently being executed by the message-sender processor belongs. This cancel request may be transferred from the specific processor to the host processor, alternatively.

In the first three embodiments of the invention, it is effective to change the forwarding processor or substitute destination processor number according to the location of where the fault occurs in the network, so that the faulty message will be forwarded to the processor that manages the execution of the job to which the program currently being executed by the processor connected to the input/output port where the fault has occurred. When a fault occurs in a message issued in the network by one of a group of job processors that are executing programs belonging to a certain job, this technique makes it possible to notify the fault occurrence to a processor that is executing a program managing those processors (one that executes programs belonging to that job).

In the third embodiment of the invention, the processors are disclosed as being arranged in two dimensions and interconnected by the crossbar networks and the relay switches. It is also possible to realize a network for a parallel computer in which the relay switches are formed by 4-input 4-output crossbar switches in and which depth-direction networks are added to arrange the processors in a 3-dimensional configuration.

According to the many embodiments of this invention and the modifications thereof, a message containing a fault is handled by transmitting it to an appropriate processor without suspending operation of the system and execution of other, unrelated jobs being executed by other processors. Therefore, the invention can be applied to plural processor networks regardless of their topology, and particularly to parallel computer networks having plural processors that execute multiple jobs simultaneously.

Further, according to the invention, when a message is transmitted that is determined to have an error in the destination processor number, it is possible to transmit the message to an appropriate processor or request a retransmission of the message from the source processor without suspending operation of the system. Further, the message can be transmitted with added information concerning the fault so that error recovery or job cancellation processing can be undertaken by the host processor, service processor or another predetermined processor.

In the explanation of the transmission of messages for all of the embodiments of the present invention, it is presumed that a message is being transmitted to only one destination processor, but the message can be broadcast to all of the processors, or partially broadcast to several of the processors by including the appropriate destination processor numbers in field A of the first word of the message.

While preferred embodiments have been set forth with specific details, further embodiments, modifications and variations are contemplated according to the broader aspects of the present invention, all as determined by the spirit and scope of the following claims.

We claim:

1. A data processing system, comprising:
 a plurality of processors connected together by a network over which data in a message format is transmitted between the processors and wherein each message has destination processor information for identifying at least one of the processors to which the message is to be transmitted;
 wherein said network comprises:
 means receiving the messages for detecting a fault in the destination processor information for each said message transmitted over the network;

switching means within the network for sending each message to at least one of the processors, said switching means including means for selecting said at least one processor in accordance with said destination processor information when no fault is detected in said destination processor information and for selecting a predetermined one of said processors as said at least one processor when a fault is detected in said destination processor information by said fault detecting means; and wherein said selecting means includes;

a first register provided within said network for holding predetermined processor identifying information indicative of said predetermined processor, wherein one said predetermined processor is used in common by plural messages being transferred through the network when any of said plural messages has destination processor information in which a fault is detected, and means for selecting said predetermined one of said processors based upon said processor identifying information of said predetermined processor held in said first register.

2. A data processing system according to claim 1, further comprising a host processor connected to said network for preloading programs to said plurality of processors by way of said network, wherein said processor identifying information of said predetermined processor is set in said first register by said host processor.

3. A data processing system according to claim 1, further comprising a service processor connected to said processors for maintenance and troubleshooting of said processors, wherein said processor identifying information of said predetermined processor is set in said first register by said service processor.

4. A data processing system according to claim 1, wherein each message transmitted between said processors has source processor information indicative of a source processor of the message, wherein said switching means includes;

means for extracting a source processor information included in a message being transferred through the network, a second register for storing said extracted source processor information, and a mode register for holding a mode value predetermined so as to be used in common for plural messages being transferred through the network, wherein said selecting means includes;

a selector receiving said mode value as an input and selecting either said processor identifying information or said extracted source processor information from one of said first and second registers in accordance with the mode value, in case a fault has been found by said detecting means in destination processor information of said message, and means for selecting one of said processors identified by the processor identifying information held in said first register, in case said processor identifying information held in said first register has been selected by said selector;

wherein said switching means further includes;

means for selecting a source processor identified by said extracted source processor information, when said extracted source processor information held in said second register has been selected.

5. A data processing system according to claim 1, further comprising means for generating information concerning a fault detected by said fault detecting means and for adding said fault information to said message having a fault when said message is sent to said predetermined processor by said switching means.

6. A data processing system, comprising:

a plurality of processors wherein the processors are connected together by a network over which data in a message format is transmitted between the processors;

each said message having destination processor information for identifying at least one of the processors to which the message is to be transmitted;

wherein said network comprises:

a plurality of message controllers connected to said processors each message controller having a fault detection circuit for detecting a fault in said destination processor information for a message sent from one of said processors and a selector for selecting at least one of the processors to which the message is transmitted, said selector selecting at least one of said processors identified by said destination processor information included in said message when no fault is detected by said fault detecting circuit and for selecting a predetermined one of said processors when a fault is detected in said destination processor information by said fault detecting circuit; and switching means connected to each said message controller for switching said message sent from one of said processors to at least one of said processors selected by said selector within said each message controller;

wherein said selecting means includes;

a first register provided within said network for holding predetermined processor identifying information indicative of said predetermined processor, wherein one said predetermined processor is used in common by plural messages being transferred through the network when any of said plural messages has destination processor information in which a fault is detected, and means for selecting said predetermined one of said processors based upon said processor identifying information of said predetermined processor held in said first register.

7. The data processing system according to claim 6, wherein said plurality of processors simultaneously execute multiple jobs;

wherein each job is executed by a group of processors;

wherein each job has a job ID and each said message contains information including the job ID for the message; and said predetermined one of said processors that receives one said message with a fault in said destination processor number is a representative one of a group of processors which execute a job identified by said lob ID in said one message.

8. A data processing system according to claim 6, wherein said network is a multi-dimensional crossbar network having at least a first series of communication bars extending in a first direction and a second intersecting series of communication bars extending in a second direction orthogonal to said first direction whereby said processors are connected to the crossbar network through multi-port switches located at unique intersections of the respective bars and identified by a multi-part address wherein each part identifies one of the series of bars so that together the parts of the address identify one of the intersections;

wherein each of said first and second series of communication bars includes said plurality of message controllers and said switching means.

9. A data processing system according to claim 8, wherein said crossbar network is a two dimensional network whereby said first direction is an X direction and said second direction is a Y direction and said address for each said processor connected to the crossbar network has an (X,Y) address.

10. A data processing system according to claim 9, wherein said multi-port switches connecting said processors to the crossbar network have three input/output ports connected respectively to the X and Y crossbars and to the processor.

11. A data processing system according to claim 9, included in said each of said first and second series of communication bars wherein each message controller further includes a coordinate pickup circuit for picking up the X and Y coordinate parts of a processor address and for storing the X,Y coordinates as a processor number in a register connected as an input to said selector within said each message controller so that said selector selects said processor number stored in said register when no fault is detected in said destination processor information.

12. A data processing system according to claim 9, wherein each message controller included in said each of said first and second series of communication bars includes a destination decision circuit for determining the X and Y coordinate parts of a destination processor address in relation to a source processor address and for storing the X,Y coordinates as a destination processor number in a register connected as an input to said selector within said each message controller so that said selector selects said processor number stored in said register when no fault is detected in said destination processor information.

13. A data processing system according to claim 2, wherein said host processor is included as part of said processors.

14. A data processing system according to claim 4, wherein each message transmitted between said processors further has processor information indicative of one of said processors to which said message is to be transferred in case a fault has occurred in destination processor information of said message, wherein said switching means further includes;

means for extracting processor identifying information included in a message being transferred through the network, and a third register for holding said extracted processor identifying information of said one processor, and wherein said selector selects either one of said processor identifying information of said predetermined processor, said extracted source processor information and said extracted processor identifying information of said one from one of said first to said third registers, in accordance with the mode value, in case a fault has been found by said detecting means in destination processor information of said message, wherein said means for selecting one of said processors further selects one of said processors identified by the extracted processor identifying information of said one processor held in said third register, in case said extracted processor identifying information of said one processor held in said third register has been selected by said selector.

15. A data processing system according to claim 4, further comprising a host processor connected to said network for preloading programs to said plurality of processors by way of said network;

wherein said processor identifying information of said predetermined processor is set in said first register by said host processor.

16. A data processing system according to claim 4, further comprising a service processor connected to said processors for maintenance and troubleshooting of said processors, wherein said processor identifying information of said predetermined processor is set in said first register by said service processor.

17. A data processing system, comprising:

a plurality of processors connected together by a network over which data in a message format is transmitted between the processors and wherein each message has destination processor information for identifying at least one of the processors to which the message is to be transmitted;

wherein said network comprises:

a switch circuit connected to said processors for establishing plural message transfer paths so that different messages provided by different source processors can be transferred to different destination processors along different message paths in parallel;

a switch control circuit connected to said switch circuit for controlling said switch circuit with respect to message transfer paths to be formed thereby;

a detection circuit connected to said switch circuit and responsive to destination processor information within a message being transmitted by said switch circuit for detecting a fault within said destination processor information within said message being transmitted; and a message transfer control circuit connected to said switch control circuit and said detection circuit and responsive to first detection by said detection circuit that no fault is detected in said destination processor information within said message being transmitted for causing said switch control circuit to control said switch circuit, so that said message being transmitted is further transmitted along a message transfer path established by said switch circuit to one of said processors identified by said destination processor information within said message being transmitted, and responsive to second detection by said detection circuit that a fault is detected in said destination processor information within said message being transmitted for causing said switch control circuit to control said switch circuit so that said message being transmitted is further transmitted along a message transfer path established by said switch circuit to one of said processors which is predetermined as a processor which deals with said message being transmitted when a fault is detected in said destination processor information therewith;

wherein said message transfer control circuit comprises:

a message modifying circuit connected to said detection circuit and responsive to said second detection thereby for modifying said message being transmitted so as to replace said destination processor information by predetermined destination processor information which identifies said predetermined processor; and a message supply circuit connected to said detection circuit and said message modifying circuit and responsive to said first detection by said detection circuit for supplying said switch control circuit with a portion of destination processor information within said message being transmitted and responsive to said second detection by said detection circuit for supplying said switch control circuit with a portion of destination processor information within said message modified;

wherein said switch control circuit comprises a circuit for controlling said switch circuit based upon each of said portion of destination processor information of said message being transmitted and said portion of destination processor information of said message modified both supplied by said message supply circuit;

wherein said message transfer control circuit further comprises a register for holding said predetermined destination processor information which identifies said predetermined processor;

wherein said message modifying circuit has a circuit responsive to said second detection by said detection circuit for replacing said destination processor information within said message being transmitted by said predetermined destination processor information within said register.

18. A data processing system, comprising:

a plurality of processors connected together by a network over which data in a message format is transmitted between the processors and wherein each message has destination processor information for identifying at least one of the processors to which the message is to be transmitted;

wherein said network comprises:

a switch circuit connected to said processors for establishing plural message transfer paths so that different messages provided by different source processors can be transferred to different destination processors along different message paths in parallel;

a switch control circuit connected to said switch circuit for controlling said switch circuit with respect to message transfer paths to be formed thereby;

a detection circuit connected to said switch circuit and responsive to destination processor information within a message being transmitted by said switch circuit for detecting a fault within said destination processor information within said message being transmitted; and a message transfer control circuit connected to said switch control circuit and said detection circuit and responsive to first detection by said detection circuit that no fault is detected in said destination processor information within said message being transmitted for causing said switch control circuit to control said switch circuit, so that said message being transmitted is further transmitted along a message transfer path established by said switch circuit to one of said processors identified by said destination processor information within said message being transmitted, and responsive to second detection by said detection circuit that a fault is detected in said destination processor information within said message being transmitted for causing said switch control circuit to control said switch circuit so that said message being transmitted is further transmitted along a message transfer path established by said switch circuit to one of said processors which is predetermined as a processor which deals with said message being transmitted when a fault is detected in said destination processor information therewith;

wherein said message transfer control circuit comprises:

a message modifying circuit connected to said detection circuit and responsive to said second detection thereby for modifying said message being transmitted so as to replace said destination processor information by predetermined destination processor information which identifies said predetermined processor; and a message supply circuit connected to said detection circuit and said message modifying circuit and responsive to said first detection by said detection circuit for supplying said switch control circuit with a portion of destination processor information within said message being transmitted and responsive to said second detection by said detection circuit for supplying said switch control circuit with a portion of destination processor information within said message modified;

wherein said switch control circuit comprises a circuit for controlling said switch circuit based upon each of said portion of destination processor information of said message being transmitted and said portion of destination processor information of said message modified both supplied by said message supply circuit;

wherein each message transmitted by said switch circuit further includes substitute processor information which identifies one of said processors which is predetermined as a processor which deals with said each message when a fault is detected in said destination processor information during transmission of said each message through said network;

wherein said message modifying circuit has a circuit responsive to said second detection by said detection circuit for replacing said destination processor information within said message being transmitted by substitute processor information; and wherein said predetermined processor is programmed so as to execute a fault handling program to deal with a fault detected with processor destination information of a message, when said message being transmitted is further transferred to said predetermined processor.

19. A data processing system according to claim 18, wherein each message transmitted by said switch circuit further includes source processor information which identifies a source processor said each message;

wherein said predetermined processor of said message being transmitted, as identified by a source processor information included therein, that a fault of said destination processor information within said message being transmitted has occurred, said informing being executed over said network as a result of execution of said fault handling program.

20. A data processing system according to claim 18, wherein said predetermined processor is programmed so as to request said source processor of said message being transmitted that said source processor should retransmit said message being transmitted, said requesting being executed over said network as a result of execution of said fault handling program.

21. A data processing system according to claim 18, wherein said processors are programmed so as to execute plural jobs in parallel in such a manner that plural processors execute programs belonging to a same one of said plural jobs in parallel;

wherein each message transmitted by said switch circuit further includes a job ID which identifies one of said jobs to which a program which has sent said each message belongs;

wherein said predetermined processor is programmed so as to inform plural processors which execute programs belonging to a job as identified by a job ID included in said message being transmitted that a fault has occurred with said destination processor information within said message being transmitted, said informing being executed over said network as a result of execution of said fault handling program.

22. A data processing system according to claim 21, wherein said predetermined processor is programmed so as to request said plural processors which execute said programs belonging to said job to cancel execution of said programs, said requesting being executed over said network as a result of execution of said fault handling program.

23. A data processing system according to claim 21, wherein said predetermined processor is one representative of said plural processors which execute said programs belonging to said job.

24. A data processing system, comprising:

a plurality of processors connected together by a network over which data in a message format is transmitted between the processors and wherein each message has destination processor information for identifying at least one of the processors to which the message is to be transmitted;

wherein said network comprises:

a switch circuit connected to said processors for establishing plural message transfer paths so that different messages provided by different source processors can be transferred to different destination processors along different message paths in parallel;

a switch control circuit connected to said switch circuit for controlling said switch circuit with respect to message transfer paths to be formed thereby;

a detection circuit connected to said switch circuit and responsive to destination processor information within a message being transmitted by said switch circuit for detecting a fault within said destination processor information within said message being transmitted; and a message transfer control circuit connected to said switch control circuit and said detection circuit and responsive to first detection by said detection circuit that no fault is detected in said destination processor information within said message being transmitted for causing said switch control circuit to control said switch circuit, so that said message being transmitted is further transmitted along a message transfer path established by said switch circuit to one of said processors identified by said destination processor information within said message being transmitted, and responsive to second detection by said detection circuit that a fault is detected in said destination processor information within said message being transmitted for causing said switch control circuit to control said switch circuit so that said message being transmitted is further transmitted along a message transfer path established by said switch circuit to one of said processors which is predetermined as a processor which deals with said message being transmitted when a fault is detected in said destination processor information therewith;

wherein said message transfer control circuit comprises:

a message modifying circuit connected to said detection circuit and responsive to said second detection thereby for modifying said message being transmitted so as to replace said destination processor information by predetermined destination processor information which identifies said predetermined processor; and a message supply circuit connected to said detection circuit and said message modifying circuit and responsive to said first detection by said detection circuit for supplying said switch control circuit with a portion of destination processor information within said message being transmitted and responsive to said second detection by said detection circuit for supplying said switch control circuit with a portion of destination processor information within said message modified;

wherein said switch control circuit comprises a circuit for controlling said switch circuit based upon each of said portion of destination processor information of said message being transmitted and said portion of destination processor information of said message modified both supplied by said message supply circuit;

wherein each message transmitted by said switch circuit further includes substitute processor information which identifies one of said processors which is predetermined as a processor which deals with said each message when a fault is detected in said destination processor information during transmission of said each message through said network;

wherein said message modifying circuit has a circuit responsive to said second detection by said detection circuit for replacing said destination processor information within said message being transmitted by substitute processor information;

wherein said switch circuit comprises a plurality of switches each for changing a message transfer path to be formed by said switch circuit;

wherein said switch control circuit comprises a plurality of switch control circuits each provided in correspondence to one of said plurality of switches, each switch control circuit controlling a corresponding switch with respect to a message transfer path to be changed thereby;

wherein said detection circuit comprises a plurality of detection circuit each provided in correspondence to one of said plurality of switches, each detection circuit responding to destination processor information within a message supplied to a corresponding switch and detecting a fault within said destination processor information within said message supplied;

wherein said message transfer control circuit comprises a plurality of message transfer control circuits each provided in correspondence to one of said plurality of switches;

wherein each message transfer control circuit is connected to a corresponding one of said plurality of switch control circuits and to a corresponding one of said plurality of detection circuits;

wherein each message transfer control circuit comprises a circuit responsive to first detection by said corresponding detection circuit that no fault is detected in said destination processor information within said message supplied to a corresponding switch for causing said corresponding switch control circuit to control said corresponding switch, so that said message supplied is further transmitted along a message transfer path established by said switch circuit to one of said processors identified by said destination processor information within said message supplied, and responsive to second detection by said corresponding detection circuit that a fault is detected in said destination processor information within said message supplied for causing said corresponding switch control circuit to control said corresponding switch so that said message supplied is further transmitted along a message transfer path established by said switch circuit to said predetermined processor.

* * * * *